United States Patent
Wilz, Sr. et al.

(10) Patent No.: US 9,489,555 B2
(45) Date of Patent: *Nov. 8, 2016

(54) LASER SCANNING CODE SYMBOL READING SYSTEM EMPLOYING PROGRAMMABLE DECODE TIME-WINDOW FILTERING

(71) Applicant: Metrologic Instruments, Inc., Blackwood, NJ (US)

(72) Inventors: David M. Wilz, Sr., Sewell, NJ (US); Sergio Movsessian, Flourtown, PA (US); Hong Ji, Blackwood, NJ (US); Thomas Haggerty, Blackwood, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/806,855

(22) Filed: Jul. 23, 2015

(65) Prior Publication Data

US 2015/0332077 A1    Nov. 19, 2015

Related U.S. Application Data

(63) Continuation of application No. 13/897,634, filed on May 20, 2013, now Pat. No. 9,092,682.

(60) Provisional application No. 61/741,780, filed on May 25, 2012.

(51) Int. Cl.
*G06K 7/10* (2006.01)

(52) U.S. Cl.
CPC ....... *G06K 7/10821* (2013.01); *G06K 7/10554* (2013.01); *G06K 7/10801* (2013.01); *G06K 7/10881* (2013.01)

(58) Field of Classification Search
CPC ............... G06K 7/10821; G06K 7/14; G06K 7/10772; G06K 7/10702; G06K 2207/1016; G06K 7/10693; G06K 7/10554; G06K 7/10801; G06K 7/10881
USPC ............. 235/462.01, 462.25, 462.32, 462.33
See application file for complete search history.

(56) References Cited

U.S. PATENT DOCUMENTS

| | | | |
|---|---|---|---|
| 4,593,186 A * | 6/1986 | Swartz | G06K 7/10633 235/462.07 |
| 5,302,813 A | 4/1994 | Goren | |

(Continued)

FOREIGN PATENT DOCUMENTS

CN    103559471 A    2/2014

*Primary Examiner* — Paultep Savusdiphol
(74) *Attorney, Agent, or Firm* — Additon, Higgins & Pendleton, P.A.

(57) ABSTRACT

A method and system for reading code symbols using a code symbol reading system having a programmable decode time-window filter mode of operation. During this mode of operation, only decoded code symbols that have been scanned within a selected (e.g. central) portion of the laser scan line field are processed according to a special decode time-window filtering function. In particular, if the decoded bar code symbol is a programming-type bar code symbol, then the system controller applies the function represented by the programming-type bar code symbol; and if the decoded bar code symbol is a non-programming-type bar code symbol, then the system controller either transmits symbol character data associated therewith to the host system or stores the symbol character data within memory aboard the bar code symbol reading system.

20 Claims, 13 Drawing Sheets

(56) References Cited

U.S. PATENT DOCUMENTS

| | | |
|---|---|---|
| 5,340,971 A | 8/1994 | Rockstein et al. |
| 5,742,042 A | 4/1998 | Scofield |
| 5,787,103 A | 7/1998 | Coleman |
| 6,082,621 A | 7/2000 | Chan et al. |
| 6,095,421 A | 8/2000 | Barkan et al. |
| 6,209,788 B1 | 4/2001 | Bridgelall et al. |
| 6,247,647 B1 | 6/2001 | Courtney et al. |
| 6,347,743 B2 * | 2/2002 | Wilz, Sr. ............ G06K 7/10871 235/462.01 |
| 6,827,272 B2 | 12/2004 | Kolstad |
| 7,042,484 B2 | 5/2006 | Cervantes |
| 9,092,682 B2 | 7/2015 | Wilz, Sr. et al. |
| 2005/0103866 A1 * | 5/2005 | Zhu .................... G06K 7/10732 235/462.45 |

\* cited by examiner

Case: Object Detected in "Far Field" Portion of Scan Field at Time T1

Case: Object Detected in "Near Field" Portion of Scan Field at Time T2

Case: Object Detected in "Far Field" Portion of Scan Field at Time T1

Case: Object Detected in "Near Field" Portion of Scan Field at Time T2

LASER SCANNING CODE SYMBOL READING SYSTEM EMPLOYING PROGRAMMABLE DECODE TIME-WINDOW FILTERING

CROSS-REFERENCE TO RELATED APPLICATIONS

The present application claims the benefit of U.S. patent application Ser. No. 13/897,634 for a Laser Scanning Code Symbol Reading System Employing Programmable Decode Time Window Filtering filed May 20, 2013 (and published Nov. 28, 2013 as U.S. Patent Application Publication No. 2013/0313325), now U.S. Pat. No. 9,092,682, which claims the benefit of U.S. Patent Application No. 61/741,780 for a Laser Scanning Code Symbol Reading System Employing Programmable Decode Time Window Filtering, filed May 25, 2012. Each of the foregoing patent applications, patent publication, and patent is hereby incorporated by reference in its entirety.

FIELD OF DISCLOSURE

The present disclosure relates to an improved method of and apparatus for laser scanning bar code symbols during bar code symbol reading operations.

BACKGROUND

Under normal circumstances, a hand-held laser-based bar code symbol reader will scan and decode any bar code symbol it detects on a given laser scan line and transmit its symbol character data to the host system or store the symbol character data within onboard memory. This type of system operation is often desired under certain circumstances, such as scanning menus or programming-type bar codes. However, it sometimes desirable to scan and decode bar code symbols with a greater degree of control that is not supported by conventional laser-scanning systems, creating significant drawbacks in challenging scanning applications.

Thus, there is a great need in the art for an improved hand-supportable laser-scanning bar code symbol reader, that is capable of selectively reading code symbols with increased levels of end-user control, while avoiding the shortcomings and drawbacks of prior art methods and apparatus.

SUMMARY

A primary object of the present disclosure is to provide an improved method of and apparatus for laser scanning objects and reading bar code symbols only within a limited portion of a laser scan line field so as to provide the end-user with increased levels of control during hand-supported bar code symbol reading operations.

Another object is to provide a hand-supportable laser scanner employing a dynamically-programmable decode time-window filter and programmed processor that processes each line of scan data buffered in a scan data buffer during each scanning cycle to (i) decode any code symbol represented in the scan data and generate symbol character data representative of a decoded code symbol, (ii) determine whether or not at least a portion of the line of scan data corresponding to a decoded code symbol falls within the time duration of the decode time-window filter, and (iii) only transmit to its intended destination, symbol character data associated with the decoded code symbol, when at least a portion of the line of scan data, associated with the decoded code symbol, falls within the time duration of the decode time-window filter.

Another object is to provide a hand-supportable laser scanner with a mode of decode time-window filter operation, wherein only decoded bar code symbols scanned within a pre-specified portion of the laser scan line field are processed according to a special decode time-window filtering function, namely: if the decode code symbol is a programming-type code symbol, then the system controller applies the function represented by the programming-type code symbol; and if the decoded code symbol is a non-programming-type code symbol, then the system controller either transmits symbol character data associated therewith to the host system, or stores the symbol character data within memory aboard the bar code symbol reading system.

Another object is to provide such a hand-supportable laser scanner with a dynamically-programmed decode time-window filter that defines a time duration, or percentage of the laser scan line field, based on the distance or range of the scanned object from the laser scanner, during which decoded code symbol data is permitted to pass onto the host system, onboard memory or processor, and outside of which, the decoded code symbol data is filtered out.

Another object is to provide such a hand-supportable laser scanner, wherein the mode of decode time-window filter operation can be selected, and activated, in a variety of different ways, including, but not limited to: (i) upon generating an external signal (e.g. by depressing a button on the scanning system); (ii) upon successfully reading a programming code or a bar code menu code; and/or (iii) upon programming system configuration parameters (SCPs) which pre-determine the percentage of the scan data line to be utilized for bar code symbol reading during the decode time-window filter mode of operation.

Another object is to provide a novel method of reading bar code symbols using a laser scanning bar code symbol reading system having a mode of operation which, when activated, automatically limits the reading of scanned bar code symbols along a selected (e.g. center region portion) of a linear scan line field, and to ignore the scan data of bar code symbols that have been scanned outside this selected center region of the scan line field.

Another object is to provide a novel a hand-supportable laser scanning bar code symbol reader that can automatically filter out, and not transmit to the host system, symbol character data associated with decoded lines of scan data that represent certain types of codes (e.g. programming codes or menu programming codes) to provide the end-user with increased levels of control during hand-supported code symbol reading operations.

Another object is to provide a novel a laser scanning bar code symbol reader with advanced decode time-window filtering functions, wherein if a code symbol is read outside the time duration of the time-window filter function a predetermined number of consecutive times, then, optionally, the filter will automatically (i) transmit the symbol character data to a host system if the decoded code symbol is a non-programming-type code symbol, or (ii) program the system control parameter function associated with the decoded code symbol if the decoded code symbol is a programming-type code symbol.

Further objects of the present disclosure will become more apparently understood hereinafter and in the Claims appended hereto.

BRIEF DESCRIPTION OF THE DRAWINGS

In order to more fully understand the Objects, the following Detailed Description of the Illustrative Embodiments should be read in conjunction with the accompanying Drawings, wherein.

DETAILED DESCRIPTION

Figure 1:
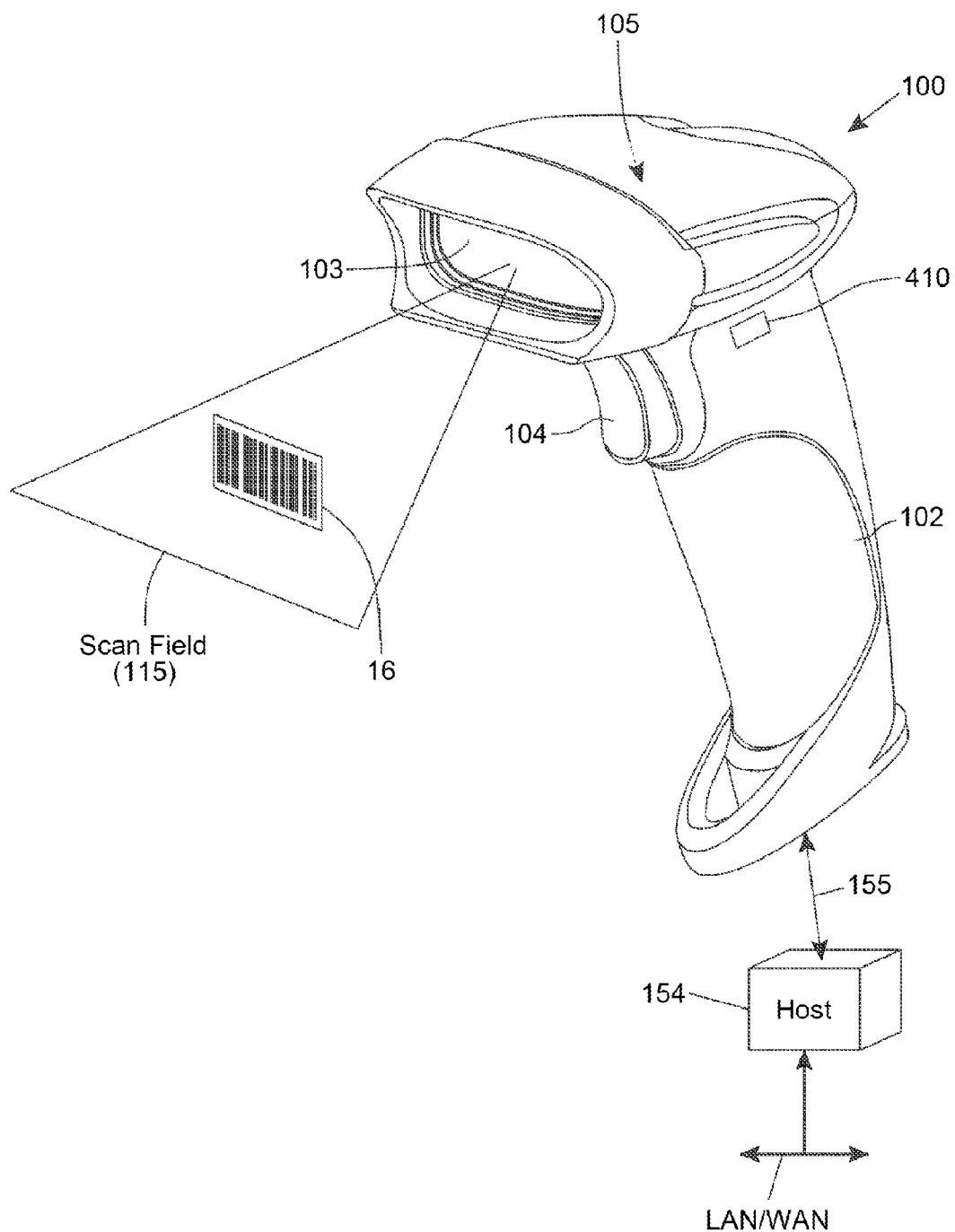
FIG. 1 is a perspective view of an illustrative embodiment of a manually-triggered hand-supportable laser scanning bar code symbol reading system, provided with a statically-programmed decode time-window filter which permits only decoded code symbol data within at least at portion of the decode time-window to pass onto the host system, while all decoded code symbol data outside of the decode time window is filtered out.

Referring to the figures in the accompanying Drawings, the illustrative embodiments of the dual laser-scanning bar code symbol reading system and method will be described in great detail, wherein like elements will be indicated using like reference numerals.

In general, the present disclosure sets forth two illustrative embodiments of a hand-supportable laser scanner having a novel decode time-window filtering mode of operation. During this mode of operation, only decoded bar code symbols scanned within a central portion of the laser scan line field are processed according to a special decode time-window filtering function, namely: if the decode code symbol is a programming-type code symbol, then the system controller applies the function represented by the programming-type code symbol; and if the decoded code symbol is a non-programming-type code symbol, then the system controller either transmits symbol character data associated therewith to the host system, or stores the symbol character data within memory aboard the bar code symbol reading system.

As will be described below, this mode of operation can be selected, and activated, in a variety of different ways, including, but not limited to: (i) upon generating an external signal (e.g. by depressing a button on the scanning system); (ii) upon successfully reading a programming code or a bar code menu code; and/or (iii) upon programming appropriate system configuration parameters (SCPs) which program the percentage of the scan line field (i.e. scan line data buffer) to be utilized for bar code symbol reading during the decode time-window filtering mode of operation.

Manually-Triggered Hand-Supportable Laser Scanning Code Symbol Reading System Employing a Statically-Programmed Decode Time-Window Filtering Mechanism within the Decode Processor Referring now to FIGS. 1 through 4, a first illustrative embodiment of a manually-triggered hand-supportable laser scanning bar code symbol reading system 1 will be described in detail.

Figure 2:
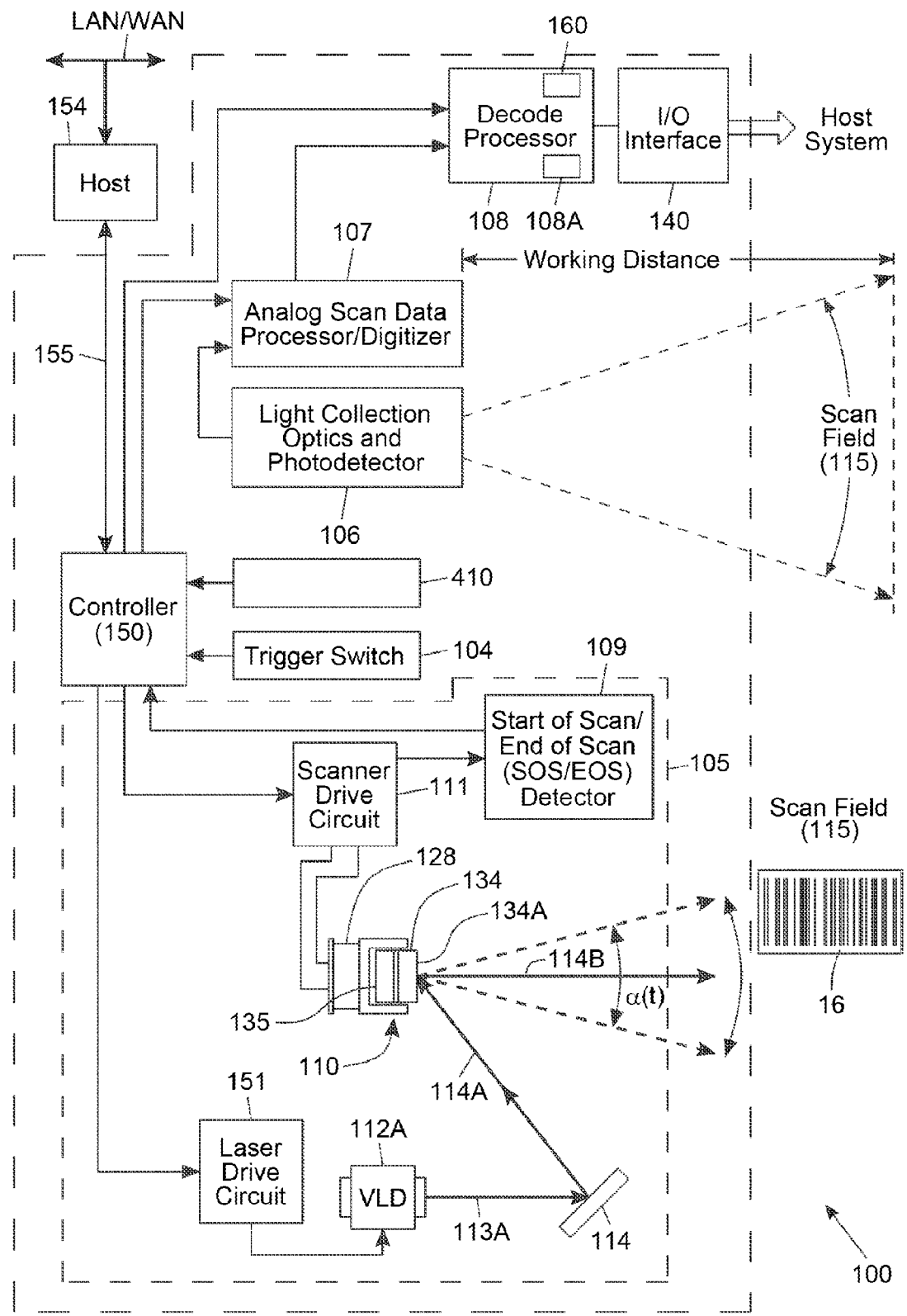
FIG. 2 is a schematic block diagram describing the major system components of the laser scanning bar code symbol reading system illustrated in FIG. 1.

As shown in FIGS. 1 and 2, the manually-triggered laser scanning bar code symbol reader 100 comprises: a hand-supportable housing 102 having a head portion and a handle portion supporting the head portion; a light transmission window 103 integrated with the head portion of the housing 102; a manually-actuated trigger switch 104 integrated with the handle portion of the housing, for generating a trigger event signal to activate laser scanning module 105 with laser scanning field 115; a laser scanning module 105, for repeatedly scanning, across the laser scanning field, a visible laser beam generated by a laser source 112 (e.g. VLD or IR LD) having optics to produce a laser scanning beam focused in the laser scanning field, in response to control signals generated by a system controller 150; wherein the laser scanning module 105 also includes a laser drive circuit 151 for receiving control signals from system controller 150, and in response thereto, generating and delivering laser (diode) drive current signals to the laser source 112A; a start of scan/end of scan (SOS/EOS) detector 109, for generating timing signals indicating the start of laser beam sweep, and the end of each laser beam sweep, and sending these SOS/EOS timing signals to the system controller 150, as well as decode processor 108; light collection optics 106 for collecting light reflected/scattered from scanned object in the scanning field, and a photo-detector for detecting the intensity of collected light and generating an analog scan data signal corresponding to said detected light intensity during scanning operations; an analog scan data signal processor/digitizer 107 for processing the analog scan data signals and converting the processed analog scan data signals into digital scan data signals, which are then converted into digital words representative of the relative width of the bars and spaces in the scanned code symbol structure; a set of scan line data line buffers 160 for buffering each complete line of scan data collected during a complete sweep of the laser scanning beam across the laser scanning field during each scanning cycle (i.e. for both scanning directions); programmed decode processor 108 for decode processing digitized data stored in said scan line data buffer 160, and generating symbol character data representative of each bar code symbol scanned by the laser scanning beam; a manually-actuatable switch 410, and associated LED indicator light, for activating, and deactivating, the decode time-window filtering mode of the system; an input/output (I/O) communication interface module 140 for interfacing with a host communication system 154 and transmitting symbol character data thereto via wired or wireless communication links 155 that are supported by the symbol reader and host system 154; and a system controller 150 for generating the necessary control signals for controlling operations within the hand-supportable laser scanning bar code symbol reading system.

As shown in FIG. 2, the laser scanning module 105 comprises a number of subcomponents, namely: laser scanning assembly 110 with an electromagnetic coil 128 and rotatable scanning element (e.g. mirror) 134 supporting a lightweight reflective element (e.g. mirror) 134A; a coil drive circuit 111 for generating an electrical drive signal to drive the electromagnetic coil 128 in the laser scanning assembly 110; and a laser beam source 112A for producing a visible laser beam 113A; and a beam deflecting mirror 114 for deflecting the laser beam 113A as incident beam 114A towards the mirror component of the laser scanning assembly 110, which sweeps the deflected laser beam 114B across the laser scanning field and a bar code symbol 16 that might be simultaneously present therein during system operation.

As shown in FIG. 2, the laser scanning module 105 is typically mounted on an optical bench, printed circuit (PC) board or other surface where the laser scanning assembly is also, and includes a coil support portion 110 for supporting the electromagnetic coil 128 (in the vicinity of the permanent magnet 135) and which is driven by a scanner drive circuit 111 so that it generates magnetic forces on opposite poles of the permanent magnet 135, during scanning assembly operation. Assuming the properties of the permanent magnet 135 are substantially constant, as well as the distance between the permanent magnet 135 and the electromagnetic coil 128, the force exerted on the permanent magnet 135 and its associated scanning element is a function of the electrical drive current supplied to the electromagnetic coil 128 during scanning operations. In general, the greater the level of drive current produced by scanner drive circuit 111, the greater the forces exerted on permanent magnet 135 and its associated scanning element, and in turn, the greater the resultant scan sweep angle $\alpha(t)$, and thus scan line length produced by the laser scanning beam. Thus, scan sweep angle $\alpha(t)$ of the scanning module 105 can be directly controlled by controlling the level of drive current supplied to the coil 128 by the scanner drive circuit 111. This will be the preferred method of controlling the scan sweep angle $\alpha(t)$ and scan line length in the present disclosure.

In general, system 100 supports a manually-triggered triggered mode of operation, and the bar code symbol reading method described below. For purposes of illustration, it is assumed that mode switch 410 is activated so that the decode time-window filtering mode is enabled into operation.

In response to the generation of a triggering event signal (i.e. by manually pulling trigger 104), the laser scanning module 105 generates and projects a laser scanning beam through the light transmission window 103, and across the laser scanning field external to the hand-supportable housing, for scanning an object in the scanning field. The laser scanning beam is generated by the laser beam source 112A in response control signals generated by the system controller 150. The scanning element (i.e. mechanism) 134 repeatedly scans the selected laser beam across a code symbol residing on an object in the laser scanning field 115, at the scan sweep angle set by the controller 150 for the current scanning cycle, determined by the process described in FIG. 3. Then, the light collection optics 106 collects light reflected/scattered from scanned code symbols on the object in the scanning field, and the photo-detector (106) automatically detects the intensity of collected light (i.e. photonic energy) and generates an analog scan data signal corresponding to the light intensity detected during scanning operations. The analog scan data signal processor/digitizer 107 processes the analog scan data signals and converts the processed analog scan data signals into digitized data signals. The programmed decode processor 108 decode processes digitized data signals and generates symbol character data representative of each bar code symbol scanned by the laser scanning beam. The decoded bar code symbol could be a programming-type or menu-type bar code symbol or an ordinary data-encoded bar code symbol not intended to perform or initiate any programming or special operations within the bar code symbol scanner.

Figure 3:
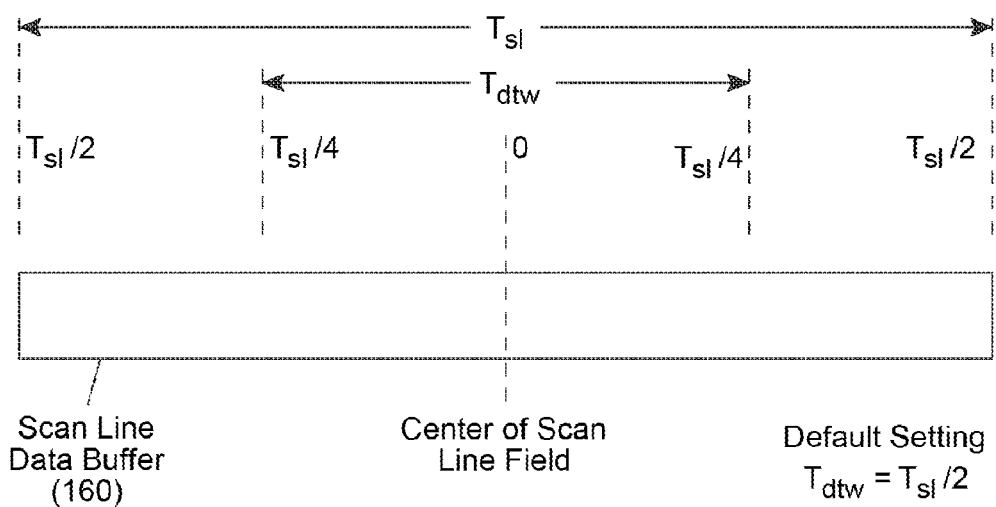
FIG. 3 is a schematic representation of the scan line data buffer supported within the decode processing module shown in FIG. 2, showing the superposition of a statically-defined decode time-window function on the scan line data buffered within the scan line data buffer.

As will be described in greater detail hereinafter, at this stage of the process, the decode time-window filtering function programmed within the system operates to filter out decoded symbol character data that has not been collected within at least a portion of the specified decode time-window $T_{dtw}$, as illustrated in FIG. 3. In this first illustrative embodiment, the decode time-window filtering function is statically programmed, and can be specified as a percentage (e.g. 45%) of the time duration of a single scan data line field, and can be defined about the center of the scan data line field, or from its left end or its right end, as the application requires. Typically, in hand-held scanning applications, the decode time-window filter function will be defined about the center of the scan data line field, whereas in fix-mount scanning applications, it might be more advantageous to define the decode time-window filter function about the left or right end of the scan data line field.

The duration of each scan data line field can be determined from the scan rate (i.e. cycles/second) of the laser beam employed in the system. For example, if the scan rate is 100 cycles per second, then it takes the laser beam 1/100 second (i.e. 0.01 seconds), to complete a single scanning cycle (i.e. complete a single back and forth motion). Thus, the length of a single scan line is ½ of the complete time for a complete scanning cycle (i.e. ½×0.01 [seconds/scanline] =0.005 [seconds/scanline] or 500 [milliseconds/scanline]. This parameter is stored in onboard memory, and is accessible by decode processor 108 during bar code symbol reading operations. In the first illustrative embodiment, the time duration of the decode time-window filter function, $T_{dtw}$, can be selected as x % of the scan line field time duration (i.e. scan line data buffer 160), centered about the center line passing through the center of the scan line field (i.e. scan line data buffer). In FIG. 3, x is chosen to be about 45% of the scan line field time duration, but could be selected to be larger or smaller, depending on the application.

As shown in FIG. 2, the decode processor 108 includes a statically-programmed decode time-window filter module 108A. The statically-programmed decode time-window filter module 108A employs scan data line buffer 160 to implement a decode time-window filter function having a time duration that is sufficient to provide a decode time-window filter function for use over the entire working range of the system. Preferably, this decode time-window filter 108A is triggered whenever a portion of the scan data associated with a decoded code symbol falls within the time domain (i.e. duration) of the decode time-window filter 108A, $T_{dtw}$ actively set within the system. When triggered, the decode time-window filter function transmits, to its destination (e.g. host system, onboard memory storage, or execution), decoded symbol character data (e.g. representative of a non-programming or programming-type bar code symbol). Thus, so long as a portion or piece of the scan data string associated with a decoded bar code symbol has time-coordinates that fall within, for example, the time duration of the decode time-window filter function $T_{dtw}$, defined, for example, about the center of a scan line field, then the decoded symbol character data (e.g. representative of a non-programming or programming-type bar code symbol) is transmitted to its destination (e.g. host system, onboard memory storage, or execution).

Symbol character data corresponding to the bar codes read (i.e. decoded) by the programmed decoder 108 is then transmitted to the host system 154 via the I/O communication interface 140, which may support either a wired and/or wireless communication link 155, well known in the art. During object detection and laser scanning operations, the system controller 150 generates the necessary control signals for controlling operations within the hand-supportable laser scanning bar code symbol reading system.

Figure 4:
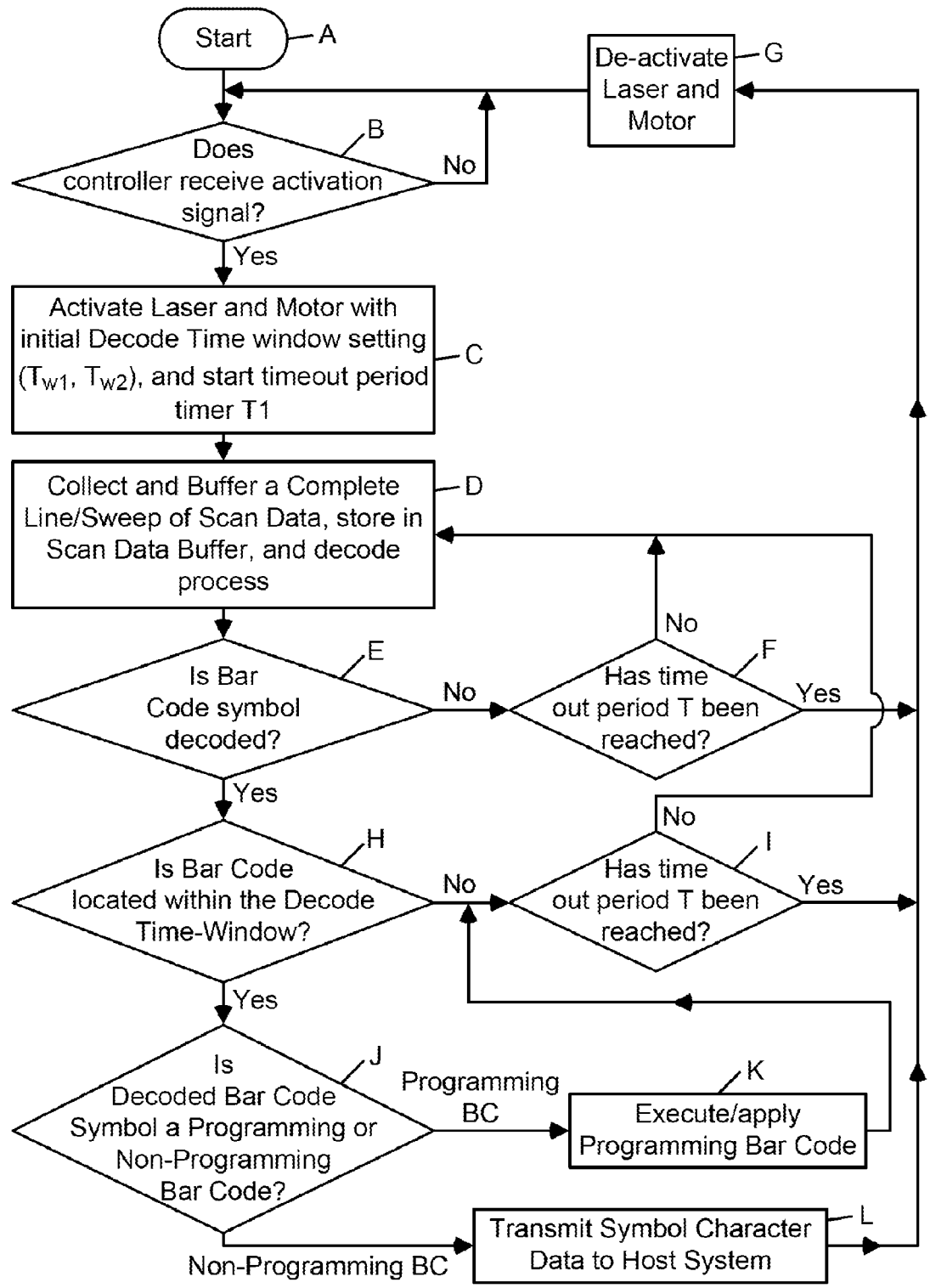
FIG. 4 is a flow chart describing the primary steps carried out in the laser scanning bar code symbol reading system of FIG. 1, wherein decoded symbol character data is automatically filtered out, and not transmitted to the host system, or programmed within the scanning system, unless at least a portion of the scan line data associated with a decoded bar code symbol (e.g. a programming code or non-programming code) is located within the specified time duration of the decode time-window filtering function programmed within the system.

Referring to FIG. 4, the method of reading bar code symbols and controlling operations within the laser scanning bar code reader 100 will be described in greater detail. Again, it is assumed that mode switch 410 is activated so that the decode time-window filtering mode is enabled into operation.

As indicated in FIG. 4, the process orchestrated by system controller 150 begins at the START Block, where all system components are activated except for the laser and scanning motor (i.e. electromagnetic coil). Then at Block B in FIG. 3A, the system controller determines if a trigger or activation event has occurred (i.e. trigger switch 104 has been manually depressed by the operator).

In the event that a trigger event has been detected at Block B, then the system controller proceeds to Block C and (i) activates the laser diode and scanner drive circuit 111 with a sufficient current to generate a full default scan sweep angle $\alpha_o(t)$, (ii) sets the decode time-window duration $T_{dtw}$, and (iii) then starts timeout period timer T1.

As indicated at Block D, the system controller commands the buffering, in a scan data buffer 160, of a complete line of scan data collected for scanning directions, over a full scan sweep angle set during the current scanning cycle. Scan data from each scan direction is buffered in a different scan line data buffer.

At Block E, the system controller determines whether the decode processor 108 has decoded a bar code symbol based on the line of scan collected and buffered in the scan data buffer 160.

If, at Block E, a bar code symbol has not been decoded (i.e. read) within the buffered line of scan data, then the system controller proceeds to Block F and determines whether or not the time out period T1 has been reached. If the time out period has not been reached, then the system controller returns to Block D and attempts to decode the scan data within time period T1 remaining. If the time out period has been reached, then the system controller proceeds to Block G, de-activates the laser source and scan motor, and then returns to Block B, as shown.

If at Block E in FIG. 4, the system controller determines that a bar code has been decoded, then at Block H the system controller determines if at least a portion of a decoded bar code symbol is detected within the decode time-window $T_{dtw}$ set at Block C, that is, is represented by scan data collected within the decode time-window $T_{dtw}$ set at Block C. If at least a portion of a decoded bar code symbol is not detected within scan data collected within the set decode time-window $T_{dtw}$, then at Block I the system controller determines whether or not the time out period has lapsed. If the time out period has lapsed, then the system controller returns to Block B. If the time out period has not lapsed, then the system controller returns to Block D, as shown.

If at Block H the system controller determines that at least a portion of a decoded bar code is detected within the scan data collected within the decode time-window set at Block C, then the system controller proceeds to Block J to determine if the decoded bar code symbol is (i) a programming-type bar code symbol (including menu-reading bar code symbol), or (ii) a non-programming bar code symbol. If the decoded bar code symbol is a programming-type bar code symbol, then at Block K, the programming-type bar code symbol is programmed within the system, and then the system controller returns to Block B, as shown; and if the decoded bar code symbol is a non-programming-type bar code symbol, then at Block L, the bar code symbol character data is transmitted to the host system, and then the system controller returns to Block B, as shown.

By virtue of the novel control process described in FIG. 4, the manually-triggered laser scanning bar code symbol reader has the capacity to intelligently filter out decoded bar code symbols that are scanned outside the statically-programmed decode time-window $T_{dtw}$, to provide the end-user a greater detail of control during laser scanning operations. As long as at least a portion of the decoded code symbol falls within the decode time window (i.e. time duration of the decode time-window filter), the filtering mechanism in the decode processor will be able operate at very close up distances to the scanning window, as well as at the extreme portions of the working distance of the scanning system.

Automatically-Triggered Hand-Supportable Laser Scanning Bar Code Symbol Reading System Employing a Dynamically-Programmed Decode Time-Window Filtering Mechanism within the Decode Processor Referring to FIGS. 5 through 8, a second illustrative embodiment of an automatically-triggered hand-supportable laser scanning bar code symbol reading system 500 will be described in detail.

Figure 5:
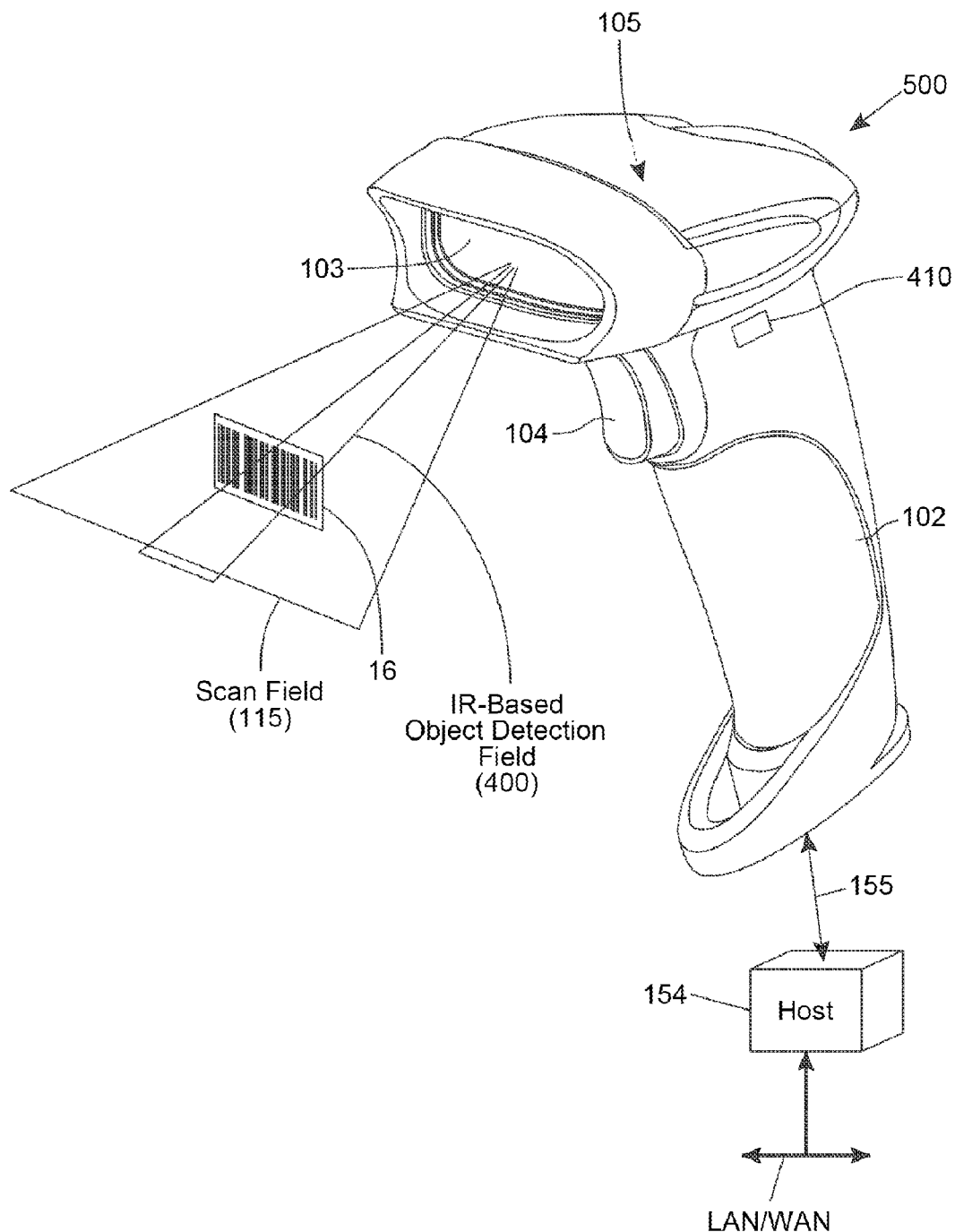
FIG. 5 is a perspective view of a second illustrative embodiment of an automatically-triggered long/short-range hand-supportable laser scanning bar code symbol reading system, provided with a dynamically-programmed decode time-window filter having a time duration based on the location (i.e. range) of the object in scanning field at any instant in time, wherein only decoded code symbol data, having at least a portion of its scan line data located within the time duration of the decode time-window, is transmitted onto the host system (or programmed within the scanning system, as the case may be), while all decoded code symbol data outside of the decode time-window is filtered out and not transmitted to the host system, stored in memory onboard the system, or programmed within the system control parameters stored in the system.
Figure 6:
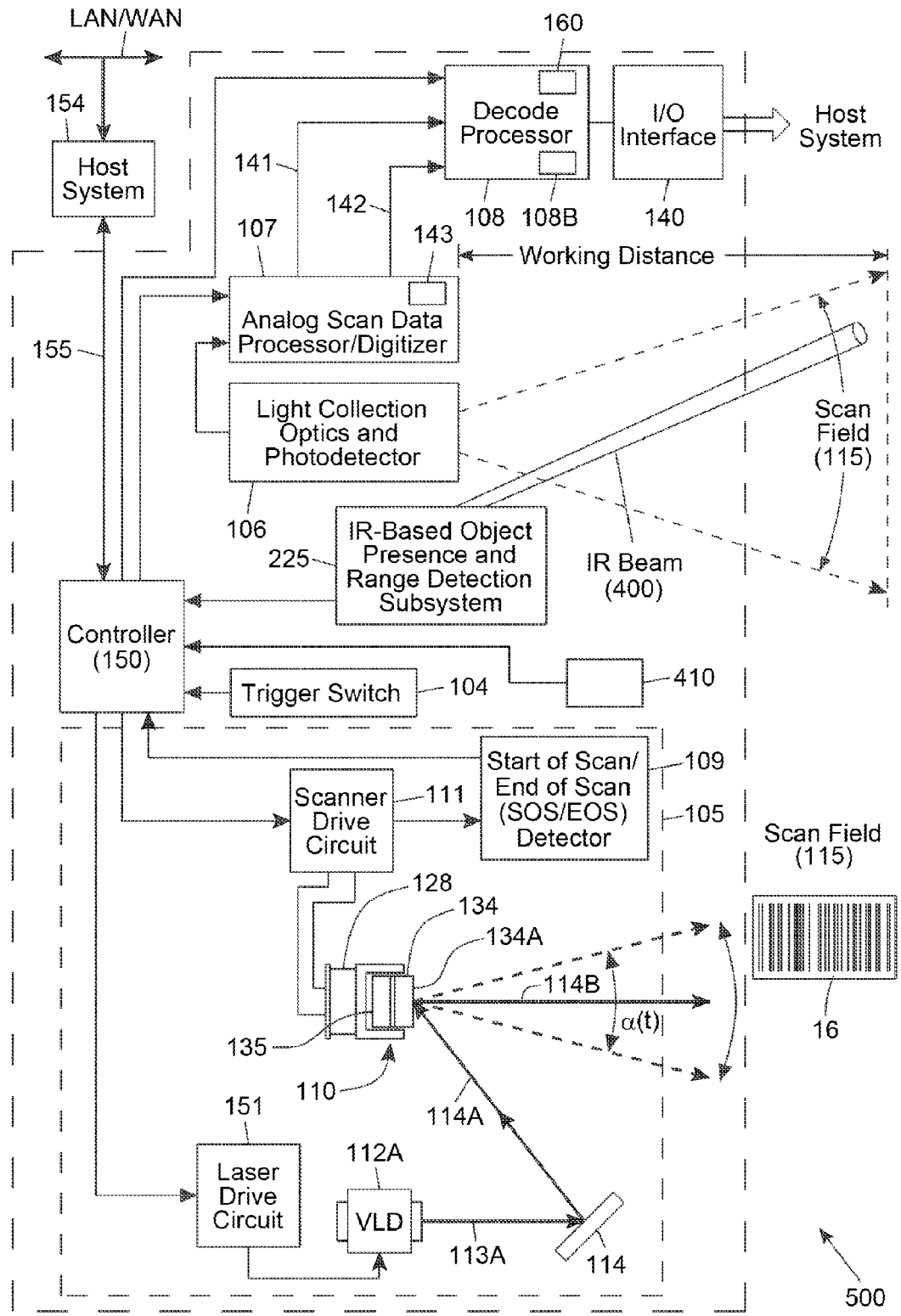
FIG. 6 is a schematic block diagram describing the major system components of the automatically-triggered long/short-range laser scanning bar code symbol reading system illustrated in FIG. 5.

As shown in FIGS. 5 and 6, the automatically-triggered laser scanning bar code symbol reader 500 comprises: a hand-supportable housing 102 having a head portion and a handle portion supporting the head portion; a light transmission window 103 integrated with the head portion of the housing 102; an IR or LED based object presence and range detection subsystem 225 disposed in the head portion of the housing, for generating an IR or LED beam within the laser scanning field, as shown in FIG. 5, for automatically detecting whether or not an object is present in the long-range (i.e. far-field) or short-range (i.e. near-field) portion of the laser scanning field, and if so, then automatically activating (i.e. triggering) the system including laser scanning module 105 to carrying out laser scan data capture and processing operations, in one or more of the detected regions of the scan field in which the object has been detected; a laser scanning module 105, for repeatedly scanning, across the laser scanning field, a visible laser beam generated by a laser source 112A (e.g. VLD or IR LD) having optics to produce a laser scanning beam focused in the laser scanning field, in response to a control signal generated by a system controller 150; wherein the laser scanning module 105 also includes a laser drive circuit 151 for receiving control signals from system controller 150, and in response thereto, generating and delivering laser (diode) drive current signals to the laser source 112A to produce a laser scanning beam during the method of bar code symbol reading described in FIG. 6; a start of scan/end of scan (SOS/EOS) detector 109, for generating timing signals indicating the start of laser beam sweep, and the end of each laser beam sweep, and sending these SOS/EOS timing signals to the system controller 150; light collection optics 106 for collecting light reflected/scattered from scanned object in the scanning field, and a photo-detector for detecting the intensity of collected light and generating an analog scan data signal corresponding to said detected light intensity during scanning operations; an analog scan data signal processor/digitizer 107 for processing the analog scan data signals and converting the processed analog scan data signals into digital scan data signals, which are then converted into digital words representative of the relative width of the bars and spaces in the scanned code symbol structure and transmitted to decode processor 108 via lines 142; a scan data signal intensity detection module 143, preferably implemented within scan data processor/digitizer 107, for continuously (i) processing the return analog (or digital) scan data signals, (ii) detecting and analyzing the intensity (i.e. magnitude) of the laser return signal, (iii) determining (e.g. estimating) the range or distance of the scanned object, relative to the scanning window, and then (iv) transmitting the range indication (i.e. estimation) signal (e.g. in the form of a digital data value) to the decode processor 108 so that it can program or set an appropriate time duration for the decode time-window filter function employed therewithin, as described in greater detail hereinafter; a set of scan line data buffers 160 for buffering each complete line of scan data collected during a complete sweep of the laser scanning beam across the laser scanning field during each scanning cycle (e.g. two scan data line buffers for buffering data collected during scanning directions); programmed decode processor 108 for decode processing digitized data stored in scan data buffer 160, and generating symbol character data representative of each bar code symbol scanned by the visible laser scanning beam; a manually-actuatable switch 410, and associated LED indicator light, for activating, and deactivating, the decode time-window filtering mode of the system; an input/output (I/O) communication interface module 140 for interfacing with a host communication system 154 and transmitting symbol character data thereto via wired or wireless communication links 155 that are supported by the symbol reader and host system 154; and a system controller 150 for generating the necessary control signals for controlling operations within the hand-supportable laser scanning bar code symbol reading system.

Preferably, IR-based object presence and range detection subsystem 225 is mounted in the front of its light transmission window so that the IR (or LED) light transmitter and IR (or LED) light receiver of subsystem 225 have an unobstructed view of an object within the laser scanning field of the system. Also, IR (or LED) object presence detection module 225 can transmit IR (or LED) signals having a continuous low-intensity output level, or having pulsed higher-intensity output level which may be used under some conditions to increase the object detection range of the system. In alternative embodiments, the IR light transmitter and IR light receiver components can be realized as visible light (e.g. red light) transmitter and visible light (e.g. red light) receiver components, respectively, implemented using LED technology, well known in the art. Typically the object detecting light beam will be modulated and synchronously detected, as taught in U.S. Pat. No. 5,340,971, incorporated herein by reference.

As shown in FIG. 5, the laser scanning module 105 comprises a number of subcomponents, namely: laser scanning assembly 110 with an electromagnetic coil 128 and rotatable or oscillating scanning element 134 supporting a lightweight reflective element; a scanner coil drive circuit 111 for generating an electrical drive signal to drive the electromagnetic coil 128 in the laser scanning assembly 110; and a laser beam source 112A for producing a visible laser beam 113A; and a beam deflecting mirror 114 for deflecting the laser beam 113A from laser beam source 112A, towards the mirror component 134A of the laser scanning assembly 110, which sweeps the laser beam 114B across the scan field and one or more bar code symbols 16 that might be simultaneously present therein during system operation.

As shown in FIG. 5, the laser scanning module 105 is typically mounted on an optical bench, printed circuit (PC) board or other surface where the laser scanning assembly is also, and includes a coil support portion 110 for supporting the electromagnetic coil 128 (in the vicinity of the permanent magnet 135) and which is driven by a scanner drive circuit 111 so that it generates magnetic forces on opposite poles of the permanent magnet 135, causing mirror component 134 to oscillate about its axis of rotation, during scanning assembly operation. Assuming the properties of the permanent magnet 135 are substantially constant, as well as the distance between the permanent magnet 135 and the electromagnetic coil 128, the force exerted on the permanent magnet 135 and its associated scanning element is a function of the electrical drive current supplied to the electromagnetic coil 128 during scanning operations. In general, the greater the level of drive current produced by scanner drive circuit 111, the greater the forces exerted on permanent magnet 135 and its associated scanning element, and in turn, the greater the resultant scan sweep angle $\alpha(t)$, and thus scan line length produced by the laser scanning beam. Thus, scan sweep angle $\alpha(t)$ of the scanning module 105 can be directly controlled by controlling the level of drive current supplied to the coil 128 by the scanner drive circuit 111. This will be the preferred method of controlling the scan sweep angle $\alpha(t)$ and scan line length in the present disclosure.

Preferably, the intensity detection module 143 is implemented within scan data processor/digitizer 107 which may be realized as an ASIC chip, supporting both analog and digital type circuits that carry out the functions and operations performed therein. As shown in FIG. 6, the decode processor 108 includes a dynamically-programmed decode time-window filter module 108B. The dynamically-programmable decode time-window filter module 108B employs scan data line buffer 160 to implement a decode time-window filter function having a continuously programmable time duration. At any instant in time, the continuously programmable time duration is determined, within decode processor 108, by the range of the scanned object determined using the range data generated by analog scan data processor/digitizer 107, over data path 142, shown in FIG. 6.

The function of the intensity detection module 143 is manifold: (i) constantly process the return analog (or digital) scan data signals and detecting and analyzing the intensity (i.e. magnitude) of the laser return signal; (ii) determine (e.g. estimate) the range or distance of the scanned object, relative to the scanning window, during each measuring period; and (iii) transmit a range/distance indication signal (e.g. in the form of digital data value) to the decode processor 108 for setting an appropriate time duration for the decode time-window filter function 108B employed therewithin. Preferably, the range or distance of the scanned object can be determined (e.g. estimated), relative to the scanning window, during each measuring period, by making a relative signal-to-noise (SNR) measurement, where the lowest SNR value corresponds to the farthest possible scanning distance in the working range of the system (relative to the scanning window), and the highest SNR value corresponds to the shortest possible scanning distance in the working range of the system. Notably, module 143 may include tables storing pre-calibrated scanning range vs. SNR values which can be used in such range/distance determinations.

In general, system 500 supports an automatically-triggered mode of operation, and a bar code symbol reading method described below. Again, it is assumed that mode switch 410 is activated so that the decode time-window filtering mode is enabled into operation.

In response to the automatic detection of an object in the laser scanning field 115, by IR or LED based object presence detection subsystem 225, the laser scanning module 105 generates and projects a laser scanning beam through the light transmission window 103, and across the laser scanning field 115 external to the hand-supportable housing, for scanning an object in the scanning field. The laser scanning beam is generated by the laser source 112B in response control signals generated by the system controller 150. The scanning element (i.e. mechanism) 134 repeatedly scans the laser beam across the object in the laser scanning field, at the scan sweep angle set by the controller 150 for the current scanning cycle, determined by the process described in FIG. 3. Then, the light collection optics 106 collects light reflected/scattered from scanned code symbols on the object in the scanning field, and the photo-detector (106) automatically detects the intensity of collected light (i.e. photonic energy) and generates an analog scan data signal corresponding to the light intensity detected during scanning operations. The analog scan data signal processor/digitizer 107 processes the analog scan data signals and converts the processed analog scan data signals into digitized data signals. Also, within the analog scan data signal processor/digitizer 107, the intensity detection module 143 performs the following functions: (i) constantly processes the return analog (or digital) scan data signals; (ii) detects and analyzes the intensity (i.e. magnitude) of the laser return signal; (ii) determines (e.g. estimates) the range or distance of the scanned object, relative to the scanning window, during each measuring period; and (iv) transmits a range/distance indication signal (e.g. in the form of digital data values) to the decode processor 108 for setting an appropriate time duration for the decode time-window filter function. The programmed decode processor 108 decode processes digitized data signals, and generates symbol character data representative of each bar code symbol scanned by the laser scanning beam. The decoded bar code symbol could be a programming-type or menu-type bar code symbol, or an ordinary data-encoded bar code symbol not intended to perform or initiate any programming or special operations within the bar code symbol scanner.

As will be described in greater detail hereinafter, at this stage of the process, the dynamically-programmed decode time-window filtering 108B operates to filter out decoded symbol character data that has not been collected from within the specified decode time-window function. In this illustrative embodiment, the decode time-window filtering function $T_{dtw}$ is dynamically programmed using the range/distance data estimated for the scanned object, and typically based on a percentage (e.g. 45%) of the time duration of a single scan data line field. The duration of each scan data line field can be easily determined from the scan rate of the laser beam employed in the system. For example if the scan rate is 100 cycles per second, then it takes the laser beam 1/100 second (i.e. 0.01 seconds), to complete a single scanning cycle (i.e. complete a single back and forth motion). Thus, the length of a single scan line is 1/2 of the complete time for a complete scanning cycle (i.e. 1/2×0.01 [seconds/scanline]=0.005 [seconds/scanline] or 500 [milliseconds/scanline]. This parameter is stored in memory and is accessible within the decode processor 108 during bar code symbol reading operations.

Figure 7A:
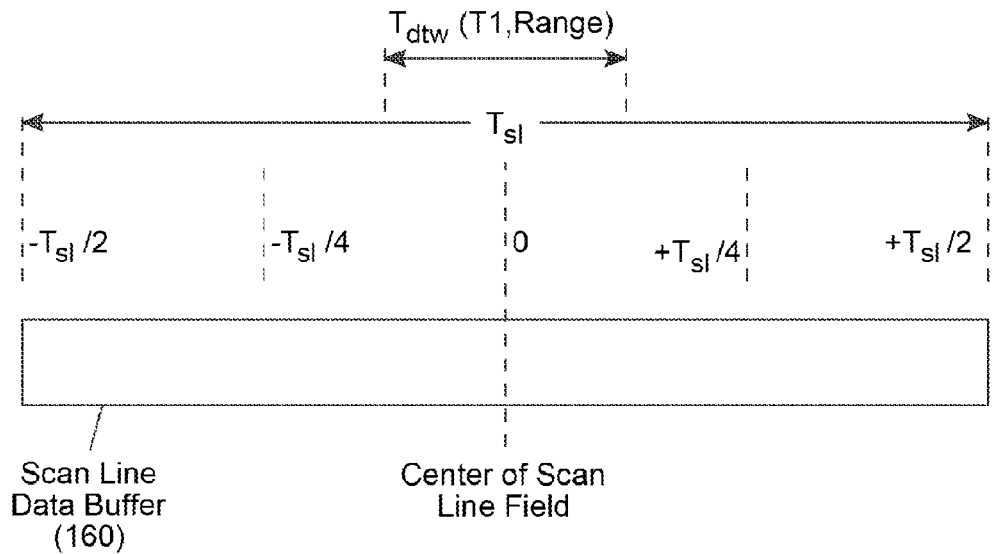
FIG. 7A is a schematic representation of the scan line data buffer supported within the decode processing module shown in FIG. 5, showing the superposition of a first (relatively-narrow) decode time-window function dynamically-programmed and superimposed on the scan line data buffered within the scan line data buffer, when the bar-coded object to be scanned is located at a first (e.g. far-field) range from the scanning window.

In FIG. 7A a first (relatively-narrow) decode time-window function $T_{dtw}$ (T1, range) is dynamically-programmed and superimposed on the scan line data buffered 160 within the scan line data buffer, when the bar-coded object to be scanned is located at a first (e.g. far-field) range from the scanning window. The time duration of a first (e.g. "far-field") decode time-window filter function, $T_{dtw}$ (T1, range) can be selected as a first % of the scan line field (i.e. scan line data buffer 160), centered about the center line passing through the center of the scan line field (i.e. scan line data buffer). It is understood that the laser beam moving across an object in the far-field region of the scan field has a significantly higher speed than objects moving in the near-field portion of the scan field. In FIG. 7A, x is chosen to be about 25% of the scan line field, but could be selected to be larger or smaller, depending on the application. This first decode time-window filter $T_{dtw}$ (T2, range) will be selected when an object is detected within the far-field (i.e. long range) portion of the laser scan field.

Figure 7B:
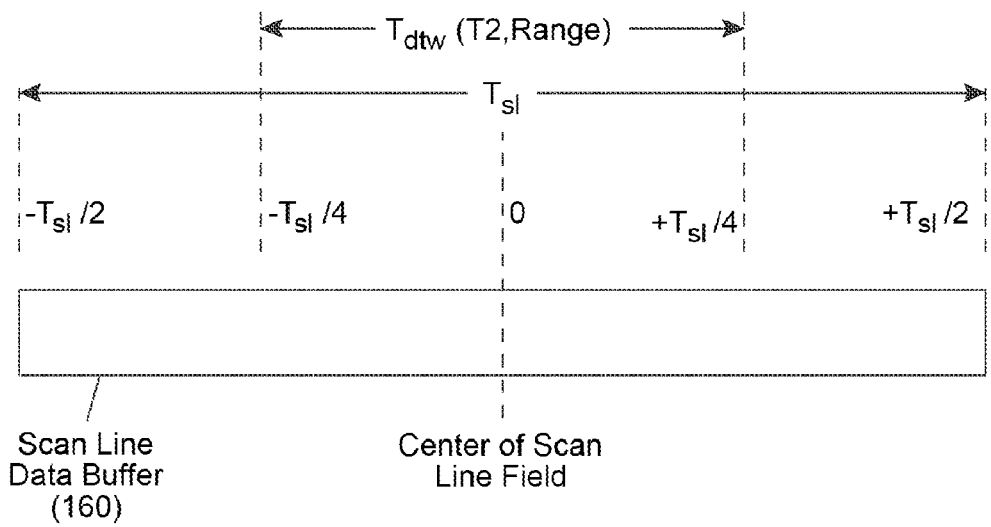
FIG. 7B is a schematic representation of the scan line data buffer supported within the decode processing module shown in FIG. 5, showing the superposition of a second (relatively wide) decode time-window function dynamically-programmed and superimposed on the scan line data buffered within the scan line data buffer, when the bar-coded object to be scanned is located at a second (e.g. near-field) range from the scanning window.

In FIG. 7B, a second (relatively-wide) decode time-window function $T_{dtw}$ (T2, range) is dynamically-programmed and superimposed on the scan line data buffered 160 within the scan line data buffer, when the bar-coded object to be scanned is located at a second (e.g. near-field) range from the scanning window. The time duration of a second (e.g. "near-field") decode time-window filter function, $T_{dtw}$ (T2, range) determined at time T2 can be selected as second % of the scan line field (i.e. scan line data buffer 160), centered about the center line passing through the center of the scan line field (i.e. scan line data buffer).

As indicated above, the time duration of the dynamically-programmed decode time-window filter module 108B is determined by the range of the scanned object in the scan field, at any given moment in time. The range measure or estimate can be determined in at least two different ways: (i) by processing collected returned laser scan signals; or (ii) using range data produced by an LED or IR based object detection/range detection mechanism. In the case of processing return laser scanning signals, the laser light signal is converted to an electrical signal which is fed into the analog scan data signal processor/digitizer 107. The strength of the processed analog or digital scan data signal, or the signal-to-noise ratio (SNR), is calculated and then used to estimate the distance/range of a scanned bar code symbol by the processor 107 which can be implemented by an ASIC chip. A strong signal or a high ratio usually corresponds to a shorter range/distance, whereas a weak signal or low ratio corresponds to a larger range/distance. The length (i.e. size) of the time duration of the decode time-window filter 108B can then be dynamically adjusted based on the signal strength or SNR, and a predetermined table/algorithm implemented in ASIC 107. Below is an exemplary table that is provided to illustrate the relationship among these three parameters, described above. The parameters can be tailored for scanners having different working ranges.

| Signal strength or SNR determined as a % of the predetermined Maximum strength or SNR value | Distance/Range between Scanner and a scanned bar code symbol | Size of Decode Time-Window Selected as a % of the full Laser scan line |
|---|---|---|
| 95% | 2 inch | 100% |
| ... | ... | ... |
| 50% | 1 foot | 30% |
| ... | ... | ... |
| 10% | 2 feet | 10% |

Notably, the dynamically-defined decode time-window filter 108B can be triggered under conditions which may differ during different scanning applications. In the second illustrative embodiment, preferably, the decode time-window filter function is triggered (i.e. activated) to transmit to its destination (e.g. host system, onboard memory storage, or execution) decoded symbol character data (e.g. representative of a non-programming or programming-type bar code symbol) whenever at least a portion of the scan data associated with the decoded code symbol falls within the decode time-window filter duration $T_{dtw}$ actively set within the system, at any moment or instant in time. As time duration of the decode time-window filter 108 is a function of object scanning range, which can vary at any instant in time, it is understood that the duration of the dynamically-programmed decode time-window filter function will also change over time, and be dependent on the object range/distance determined by the analog scan data processor/digitizer 107, as described above. This way, so long as a portion or piece of the scan data string associated with a decoded bar code symbol has time-coordinates that fall within, for example, the time duration of the decode time-window filter function $T_{dtw}$ (time, range), defined, for example, about the center of a scan line field, then the decoded symbol character data (e.g. representative of a non-programming or programming-type bar code symbol) is transmitted to its destination (e.g. host system, onboard memory storage, or execution).

Symbol character data, corresponding to the bar codes read (i.e. decoded) by the decoder 108, is then transmitted to the host system 154 via the I/O communication interface 140, which may support either a wired and/or wireless communication link 155, well known in the art. During object detection and laser scanning operations, the system controller 150 generates the necessary control signals for controlling operations within the hand-supportable laser scanning bar code symbol reading system.

Figure 8:
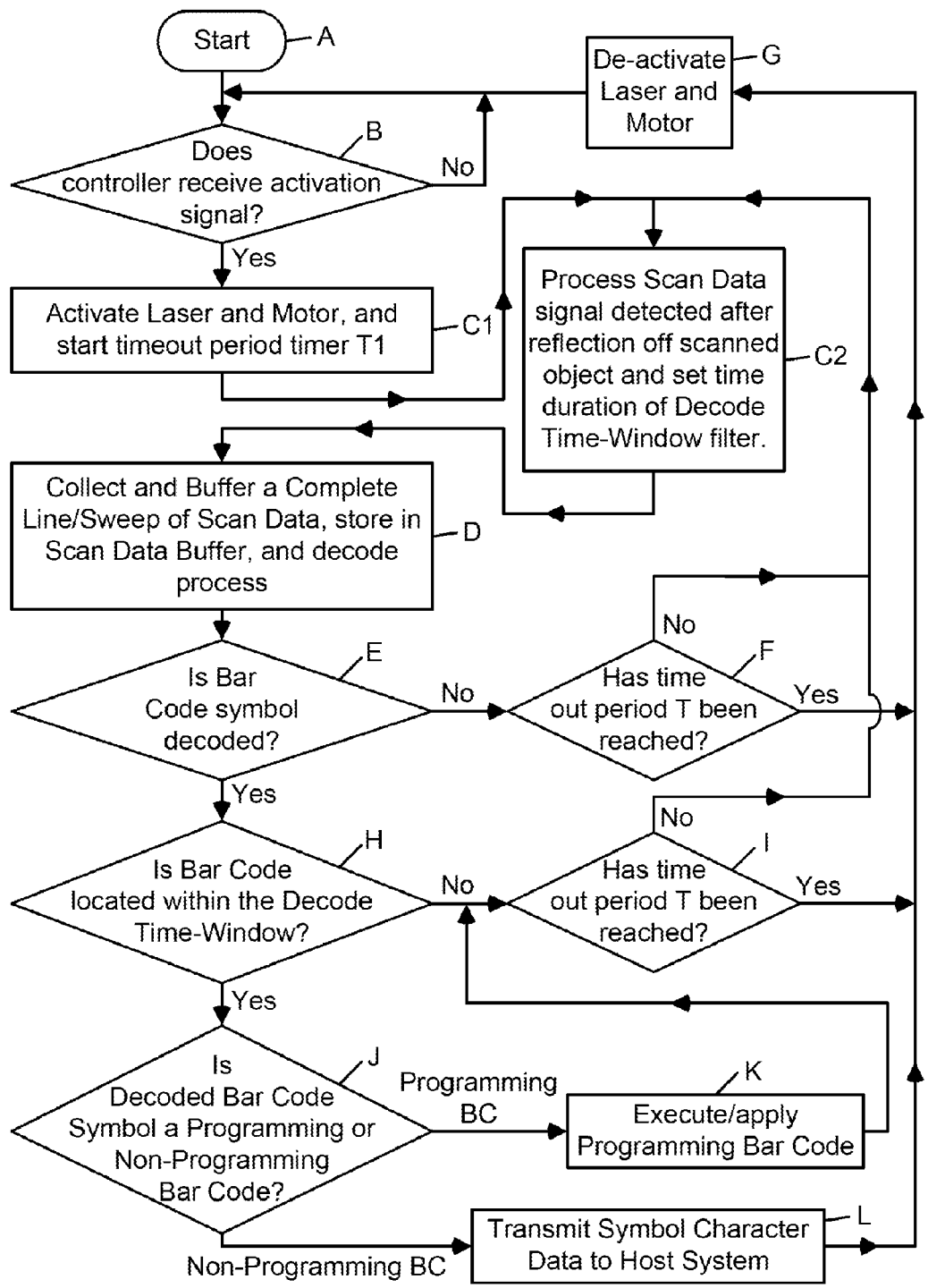
FIG. 8 is a flow chart describing the primary steps carried out in the automatically-triggered laser scanning bar code symbol reading system of FIG. 5.

Referring to FIG. 8, the method of reading bar code symbols and controlling operations within the laser scanning bar code reader 500 will be described in greater detail.

As indicated in FIG. 8, the process orchestrated by system controller 150 begins at the START Block, where all system components are activated except for the laser and scanning motor (i.e. electromagnetic coil). Then at Block B in FIG. 8, the system controller determines if a trigger or activation event has occurred (i.e. trigger switch 104 has been manually depressed by the operator).

In the event that a trigger event has been detected at Block B, then the system controller proceeds to Block C1, and (i) activates the laser diode and scanner drive circuit 111 with a sufficient current to generate a full default scan sweep angle $\alpha_o(t)$ and (ii) then starts timeout period timer T1.

At Block C2, the analog scan data signal processor/digitizer ASIC 107 processes the return analog and/or digital scan data signals, and automatically (i) measures (e.g. estimates) the range or distance between the scanned object and the scanner, (ii) determines the time duration for the decode time-window filter as a function of determined object range/distance, and (iii) programs the time duration for the decode time-window filter, for the given moment of time during the control process.

As indicated at Block D, the system controller commands the buffering, in a scan data buffer 160, of a complete line of scan data collected for scanning directions, over a full scan sweep angle set during the current scanning cycle. Scan data from each scan direction is buffered in a different scan line data buffer.

At Block E, the system controller determines whether the decode processor 108 has decoded a bar code symbol based on the line of scan collected and buffered in the scan data buffer 160.

If, at Block E, a bar code symbol has not been decoded (i.e. read) within the buffered line of scan data, then the system controller proceeds to Block F and determines whether or not the time out period T1 has been reached. If the time out period has not been reached, then the system controller returns to Block C2, processes the scan data signals, determines the object range and updates the time duration of the decode time-window filter. Thereafter, the system controller proceeds to Block D and attempts to collect and decode scan data within time period T1 remaining. If the time out period has been reached, then the system controller proceeds to Block G, de-activates the laser source and scan motor, and then returns to Block B, as shown.

If at Block E, the system controller determines that a full bar code has been decoded, then at Block H the system controller determines if a bar code symbol is detected within the decode time-window set at Block C2, that is, is represented by scan data collected within the decode time-window set at Block D. If at least a portion of a decoded bar code symbol is not detected within scan data collected within the set decode time-window $T_{dtw}$ set at Block C2, then at Block I the system controller determines whether or not the time out period has lapsed. If the time out period has lapsed, then the system controller returns to Block B. If the time out period has not lapsed, then the system controller returns to Block D, as shown.

If at Block H the system controller determines that a bar code is detected within the scan data collected within the decode time-window set at Block C2, then the system controller proceeds to Block J and decodes the bar code symbol based on the scan data within the decode time-window, and then proceeds to Block K to determine if the decoded bar code symbol is (i) a programming-type bar code symbol (including menu-reading bar code symbol), or (ii) a non-programming bar code symbol. If the decoded bar code symbol is a programming-type bar code symbol, then at Block L, the programming-type bar code symbol is programmed within the system, and then returns to Block B, as shown; and if the decoded bar code symbol is a non-programming-type bar code symbol, then at Block M, the bar code symbol character data is transmitted to the host system and then returns to Block B, as shown.

By virtue of the novel control process described in FIG. 8, the bar code symbol reader has the capacity to intelligently filter out bar code symbols that are scanned outside the dynamically-programmed decode time-windows (for different ranges/distance along the working range of the system).

Manually-Triggered Hand-Supportable Laser Scanning Bar Code Symbol Reading System Employing a Dynamically-Programmed Decode Time-Window Filtering Mechanism within the Decode Processor Referring to FIGS. 9 through 12, a third illustrative embodiment of a manually-triggered hand-supportable laser scanning bar code symbol reading system 600 will be described in detail.

Figure 9:
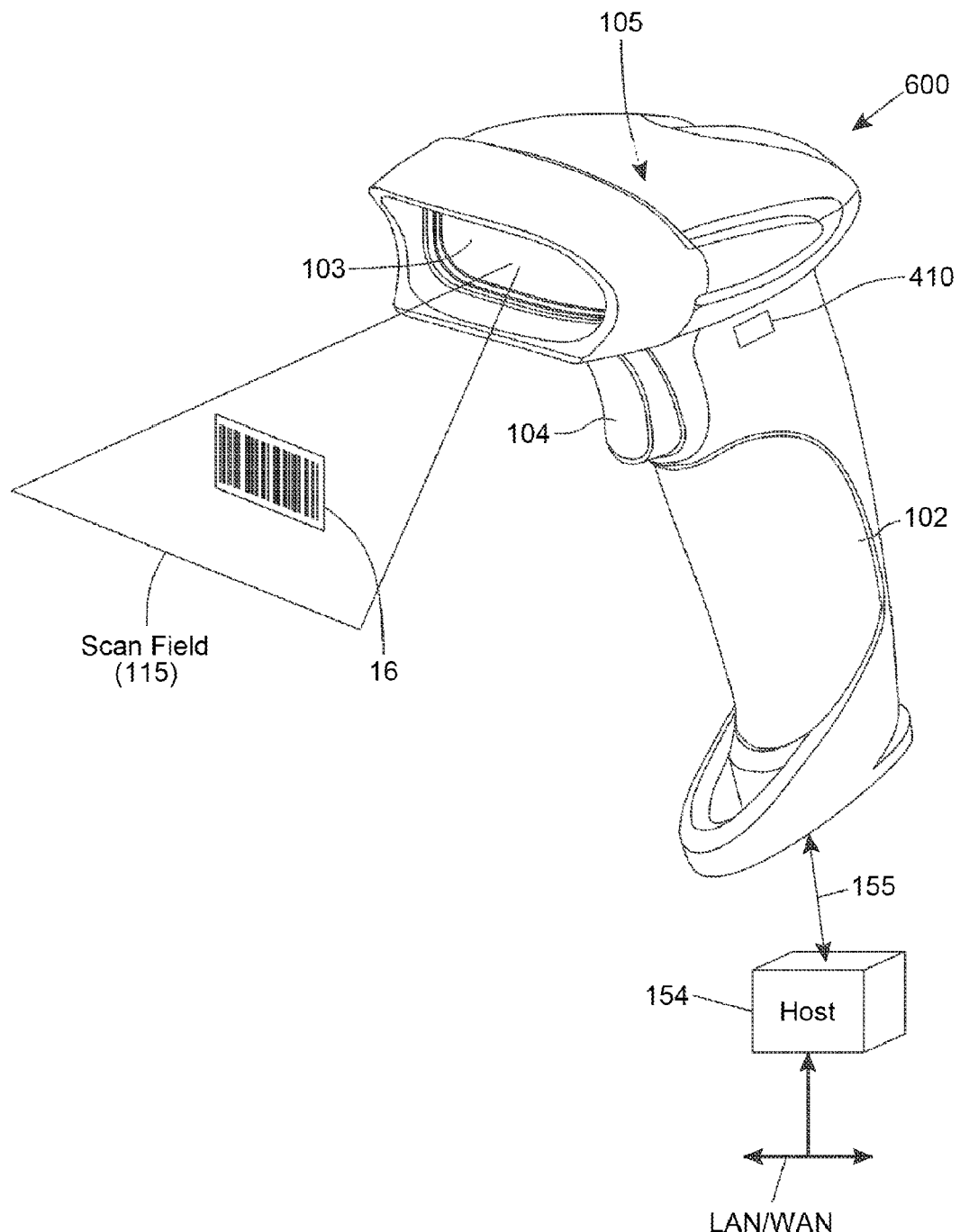
FIG. 9 is a perspective view of a third illustrative embodiment of a manually triggered long/short-range hand-supportable laser scanning bar code symbol reading system, provided with a dynamically-programmed decode time-window filter having a time duration based on the location (i.e. range) of the object in scanning field at any instant in time, wherein (i) a decoded code symbol data having at least a portion of its scan line data located within the time duration of the decode time-window, and/or (ii) a decoded symbol outside of the time window is consecutively read a pre-specified number of times, are transmitted to the host system (or programmed within the scanning system, as the case may be)
Figure 10:
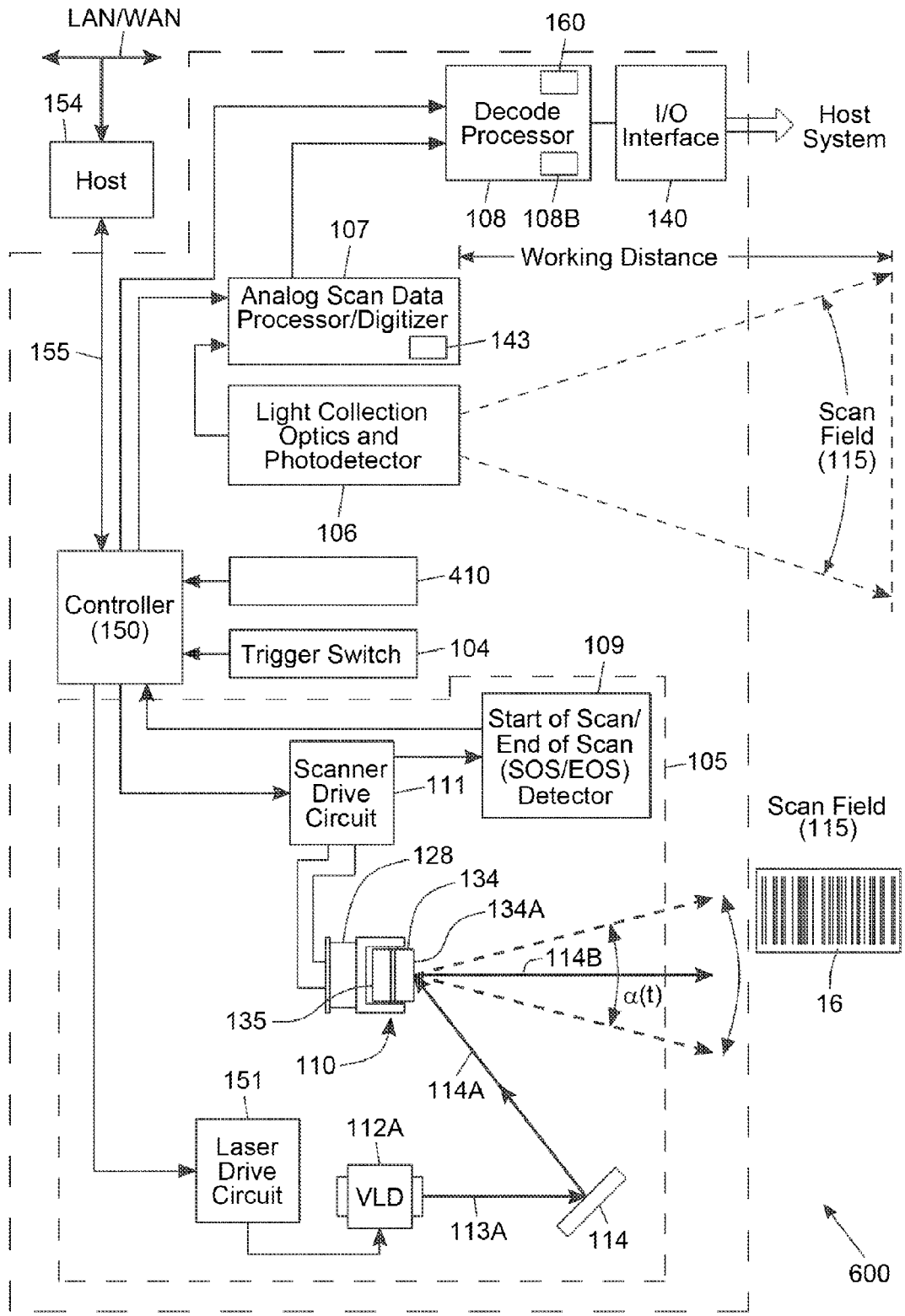
FIG. 10 is a schematic block diagram describing the major system components of the manually-triggered laser scanning bar code symbol reading system illustrated in FIG. 9.

As shown in FIGS. 9 and 10, the manually-triggered laser scanning bar code symbol reader 600 comprises: a hand-supportable housing 102 having a head portion and a handle portion supporting the head portion; a light transmission window 103 integrated with the head portion of the housing 102; a trigger switch integrated with the head portion of the housing, for generating a trigger event signal when manually actuated by the human operator; a laser scanning module 105, for repeatedly scanning, across the laser scanning field, a visible laser beam generated by a laser source 112A (e.g. VLD or IR LD) having optics to produce a laser scanning beam focused in the laser scanning field, in response to a control signal generated by a system controller 150; wherein the laser scanning module 105 also includes a laser drive circuit 151 for receiving control signals from system controller 150, and in response thereto, generating and delivering laser (diode) drive current signals to the laser source 112A to produce laser scanning beam during the method of bar code symbol reading described in FIG. 6; a start of scan/end of scan (SOS/EOS) detector 109, for generating timing signals indicating the start of laser beam sweep, and the end of each laser beam sweep, and sending these SOS/EOS timing signals to the system controller 150; light collection optics 106 for collecting light reflected/scattered from scanned object in the scanning field, and a photo-detector for detecting the intensity of collected light and generating an analog scan data signal corresponding to said detected light intensity during scanning operations; an analog scan data signal processor/digitizer 107 for processing the analog scan data signals and converting the processed analog scan data signals into digital scan data signals, which are then converted into digital words representative of the relative width of the bars and spaces in the scanned code symbol structure and transmitted to decode processor 108 via lines 142; a scan data signal intensity detection module 143, preferably implemented within scan data processor/digitizer 107, for continuously (i) processing the return analog (or digital) scan data signals, (ii) detecting and analyzing the intensity (i.e. magnitude) of the laser return signal, (iii) determining (e.g. estimating) the range or distance of the scanned object, relative to the scanning window, and then (iv) transmitting the range indication (i.e. estimation) signal (e.g. in the form of a digital data value) to the decode processor 108 so that it can program or set an appropriate time duration for the decode time-window filter function employed therewithin, as described in greater detail hereinafter; a set of scan line data buffers 160 for buffering each complete line of scan data collected during a complete sweep of the laser scanning beam across the laser scanning field during each scanning cycle (e.g. two scan data line buffers for buffering data collected during scanning directions); programmed decode processor 108 for decode processing digitized data stored in scan data buffer 160, and generating symbol character data representative of each bar code symbol scanned by the visible laser scanning beam; a manually-actuatable switch 410, and associated LED indicator light, for activating, and deactivating, the decode time-window filtering mode of the system; an input/output (I/O) communication interface module 140 for interfacing with a host communication system 154 and transmitting symbol character data thereto via wired or wireless communication links 155 that are supported by the symbol reader and host system 154; and a system controller 150 for generating the necessary control signals for controlling operations within the hand-supportable laser scanning bar code symbol reading system.

As shown in FIG. 10, the laser scanning module 105 comprises a number of subcomponents, namely: laser scanning assembly 110 with an electromagnetic coil 128 and rotatable or oscillating scanning element 134 supporting a lightweight reflective element; a scanner coil drive circuit 111 for generating an electrical drive signal to drive the electromagnetic coil 128 in the laser scanning assembly 110; and a laser beam source 112A for producing a visible laser beam 113A; and a beam deflecting mirror 114 for deflecting the laser beam 113A from laser beam source 112A, towards the mirror component 134A of the laser scanning assembly 110, which sweeps the laser beam 114B across the scan field and one or more bar code symbols 16 that might be simultaneously present therein during system operation.

As shown in FIG. 10, the laser scanning module 105 is typically mounted on an optical bench, printed circuit (PC) board or other surface where the laser scanning assembly is also, and includes a coil support portion 110 for supporting the electromagnetic coil 128 (in the vicinity of the permanent magnet 135) and which is driven by a scanner drive circuit 111 so that it generates magnetic forces on opposite poles of the permanent magnet 135, causing mirror component 134 to oscillate about its axis of rotation, during scanning assembly operation. Assuming the properties of the permanent magnet 135 are substantially constant, as well as the distance between the permanent magnet 135 and the electromagnetic coil 128, the force exerted on the permanent magnet 135 and its associated scanning element is a function of the electrical drive current supplied to the electromagnetic coil 128 during scanning operations. In general, the greater the level of drive current produced by scanner drive circuit 111, the greater the forces exerted on permanent magnet 135 and its associated scanning element, and in turn, the greater the resultant scan sweep angle $\alpha(t)$, and thus scan line length produced by the laser scanning beam. Thus, scan sweep angle $\alpha(t)$ of the scanning module 105 can be directly controlled by controlling the level of drive current supplied to the coil 128 by the scanner drive circuit 111. This will be the preferred method of controlling the scan sweep angle $\alpha(t)$ and scan line length in the present disclosure.

Preferably, the intensity detection module 143 is implemented within scan data processor/digitizer 143 which may be realized as an ASIC chip, supporting both analog and digital type circuits that carry out the functions and operations performed therein. As shown in FIG. 10, the decode processor 108 includes a dynamically-programmed decode time-window filter module 108B. The dynamically-programmable decode time-window filter module 108B employs scan data line buffer 160 to implement a decode time-window filter function having a continuously programmable time duration. At any instant in time, the continuously programmable time duration is determined, within decode processor 108, by the range of the scanned object determined using the range data generated by analog scan data processor/digitizer 107, over data path 142, shown in FIG. 10.

The function of the intensity detection module 143 is manifold: (i) constantly process the return analog (or digital) scan data signals and detecting and analyzing the intensity (i.e. magnitude) of the laser return signal; (ii) determine (e.g. estimate) the range or distance of the scanned object, relative to the scanning window, during each measuring period; and (iii) transmit a range/distance indication signal (e.g. in the form of digital data value) to the decode processor 108 for setting an appropriate time duration for the decode time-window filter function 108B employed therewithin. Preferably, the range or distance of the scanned object can be determined (e.g. estimated), relative to the scanning window, during each measuring period, by making a relative signal-to-noise (SNR) measurement, where the lowest SNR value corresponds to the farthest possible scanning distance in the working range of the system (relative to the scanning window), and the highest SNR value corresponds to the shortest possible scanning distance in the working range of the system. Notably, module 143 may include tables storing pre-calibrated scanning range vs. SNR values which can be used in such range/distance determinations.

In general, system 600 supports an automatically-triggered mode of operation, and a bar code symbol reading method described below. Again, it is assumed that mode switch 410 is activated so that the decode time-window filtering mode is enabled into operation.

In response to the generation of a trigger event signal by manual actuation of switch 104, the laser scanning module 105 generates and projects a laser scanning beam through the light transmission window 103, and across the laser scanning field 115 external to the hand-supportable housing, for scanning an object in the scanning field. The laser scanning beam is generated by the laser source 112B in response control signals generated by the system controller 150. The scanning element (i.e. mechanism) 134 repeatedly scans the laser beam across the object in the laser scanning field, at the scan sweep angle set by the controller 150 for the current scanning cycle, determined by the process described in FIGS. 12A and 12B. Then, the light collection optics 106 collects light reflected/scattered from scanned code symbols on the object in the scanning field, and the photo-detector (106) automatically detects the intensity of collected light (i.e. photonic energy) and generates an analog scan data signal corresponding to the light intensity detected during scanning operations. The analog scan data signal processor/digitizer 107 processes the analog scan data signals and converts the processed analog scan data signals into digitized data signals. Also, within the analog scan data signal processor/digitizer 107, the intensity detection module 143 performs the following functions: (i) constantly processes the return analog (or digital) scan data signals; (ii) detects and analyzes the intensity (i.e. magnitude) of the laser return signal; (ii) determines (e.g. estimates) the range or distance of the scanned object, relative to the scanning window, during each measuring period; and (iv) transmits a range/distance indication signal (e.g. in the form of digital data values) to the decode processor 108 for setting an appropriate time duration for the decode time-window filter function. The programmed decode processor 108 decode processes digitized data signals, and generates symbol character data representative of each bar code symbol scanned by the laser scanning beam. The decoded bar code symbol could be a programming-type or menu-type bar code symbol, or an ordinary data-encoded bar code symbol not intended to perform or initiate any programming or special operations within the bar code symbol scanner.

As described in detail above, the dynamically-programmed decode time-window filtering 108B operates to filter out decoded symbol character data that has not been collected from within the specified decode time-window function. In this illustrative embodiment, the decode time-window filtering function $T_{dtw}$ is dynamically programmed using the range/distance data estimated for the scanned object, and typically based on a percentage (e.g. 45%) of the time duration of a single scan data line field. The duration of each scan data line field can be easily determined from the scan rate of the laser beam employed in the system, as described above. This parameter is stored in memory and is accessible within the decode processor 108 during bar code symbol reading operations.

Figure 11A:
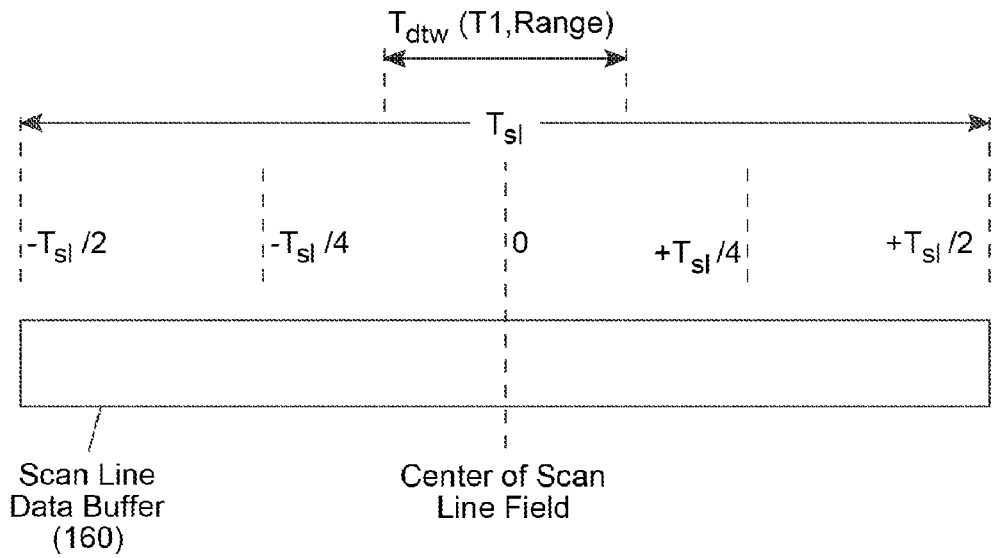
FIG. 11A is a schematic representation of the scan line data buffer supported within the decode processing module shown in FIG. 10, showing the superposition of a first (relatively-narrow) decode time-window function dynamically-programmed and superimposed on the scan line data buffered within the scan line data buffer, when the bar-coded object to be scanned is located at a first (e.g. far-field) range from the scanning window.

In FIG. 11A a first (relatively-narrow) decode time-window function $T_{dtw}$ (T1, range) is dynamically-programmed and superimposed on the scan line data buffered 160 within the scan line data buffer, when the bar-coded object to be scanned is located at a first (e.g. far-field) range from the scanning window. The time duration of a first (e.g.

"far-field") decode time-window filter function, $T_{dtw}$ (T1, range) can be selected as a first % of the scan line field (i.e. scan line data buffer 160), centered about the center line passing through the center of the scan line field (i.e. scan line data buffer). It is understood that the laser beam moving across an object in the far-field region of the scan field has a significantly higher speed than objects moving in the near-field portion of the scan field. In FIG. 7A, x is chosen to be about 25% of the scan line field, but could be selected to be larger or smaller, depending on the application. This first decode time-window filter $T_{dtw}$ (T2, range) will be selected when an object is detected within the far-field (i.e. long range) portion of the laser scan field.

Figure 11B:
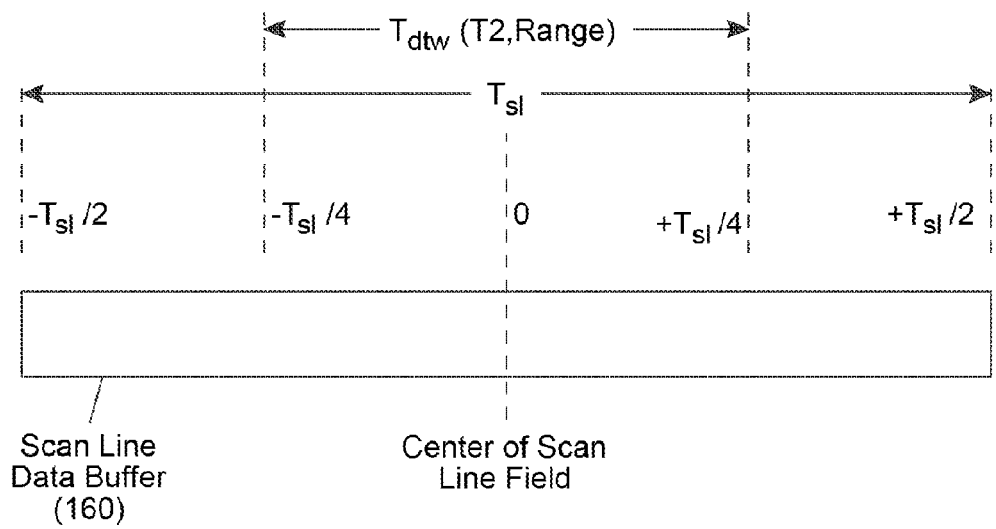
FIG. 11B is a schematic representation of the scan line data buffer supported within the decode processing module shown in FIG. 10, showing the superposition of a second (relatively wide) decode time-window function dynamically-programmed and superimposed on the scan line data buffered within the scan line data buffer, when the bar-coded object to be scanned is located at a second (e.g. near-field) range from the scanning window.

In FIG. 11B, a second (relatively-wide) decode time-window function $T_{dtw}$ (T2, range) is dynamically-programmed and superimposed on the scan line data buffered 160 within the scan line data buffer, when the bar-coded object to be scanned is located at a first (e.g. far-field) range from the scanning window. The time duration of a second (e.g. "near-field") decode time-window filter function, $T_{dtw}$ (T2, range) determined at time T2 can be selected as second % of the scan line field (i.e. scan line data buffer 160), centered about the center line passing through the center of the scan line field (i.e. scan line data buffer).

As indicated above, the time duration of the dynamically-programmed decode time-window filter module 108B is determined by the range of the scanned object in the scan field, at any given moment in time. The range measure or estimate can be determined in at least two different ways: (i) by processing collected returned laser scan signals; or (ii) using range data produced by an LED or IR based object detection/range detection mechanism. In the case of processing return laser scanning signals, the laser light signal is converted to an electrical signal which is fed into the analog scan data signal processor/digitizer 107. The strength of the processed analog or digital scan data signal, or the signal-to-noise ratio (SNR), is calculated and then used to estimate the distance/range of a scanned bar code symbol by the processor 107 which can be implemented an ASIC chip. A strong signal or a high ratio usually corresponds to a shorter range/distance, whereas a weak signal or low ratio corresponds to a larger range/distance. The length (i.e. size) of the time duration of the decode time-window filter 108B can then be dynamically adjusted based on the signal strength or SNR, and a predetermined table/algorithm implemented in ASIC 107. The exemplary table set forth above illustrates the relationship among these three parameters, described above. The parameters can be tailored for scanners having different working ranges.

Notably, the dynamically-defined decode time-window filter 108B can be triggered under conditions which may differ during different scanning applications. In the third illustrative embodiment, preferably, the decode time-window filter function is triggered (i.e. activated) to transmit to its destination (e.g. host system, onboard memory storage, or execution) decoded symbol character data (e.g. representative of a non-programming or programming-type bar code symbol) whenever at least a portion of the scan data associated with the decoded code symbol falls within the decode time-window filter duration $T_{dtw}$ actively set within the system, at any moment or instant in time. As time duration of the decode time-window filter 108 is a function of object scanning range, which can vary at any instant in time, it is understood that the duration of the dynamically-programmed decode time-window filter function will also change over time, and be dependent on the object range/distance determined by the analog scan data processor/digitizer 107, as described above. This way, so long as a portion or piece of the scan data string associated with a decoded bar code symbol has time-coordinates that fall within, for example, the time duration of the decode time-window filter function $T_{dtw}$ (time, range), defined, for example, about the center of a scan line field, then the decoded symbol character data (e.g. representative of a non-programming or programming-type bar code symbol) is transmitted to its destination (e.g. host system, onboard memory storage, or execution).

Symbol character data, corresponding to the bar codes read (i.e. decoded) by the decoder 108, is then transmitted to the host system 154 via the I/O communication interface 140, which may support either a wired and/or wireless communication link 155, well known in the art. During object detection and laser scanning operations, the system controller 150 generates the necessary control signals for controlling operations within the hand-supportable laser scanning bar code symbol reading system.

Figure 12A:
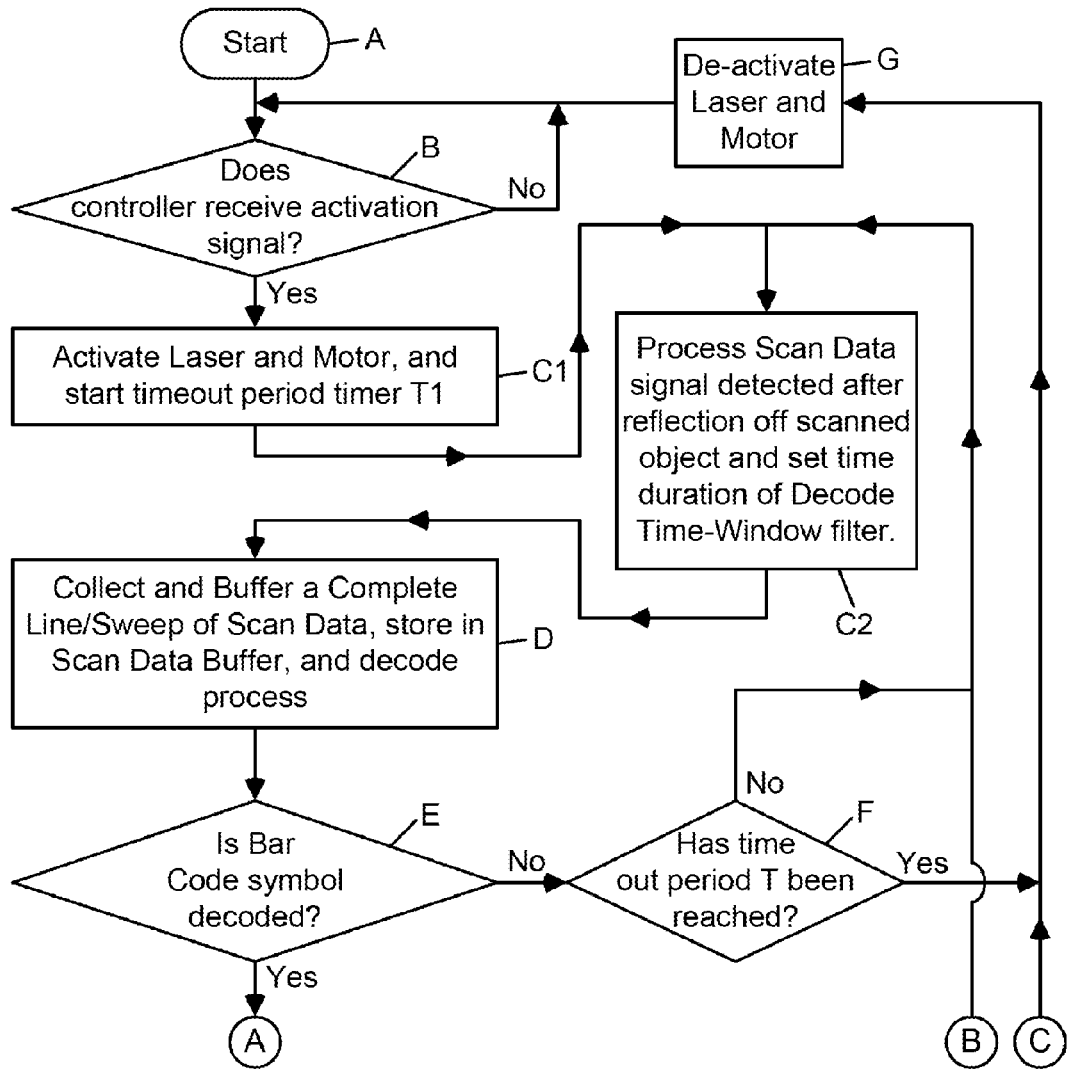
FIGS. 12A and 12B set forth a flow chart describing the primary steps carried out in the manually-triggered laser scanning bar code symbol reading system of FIG. 9.
Figure 12B:
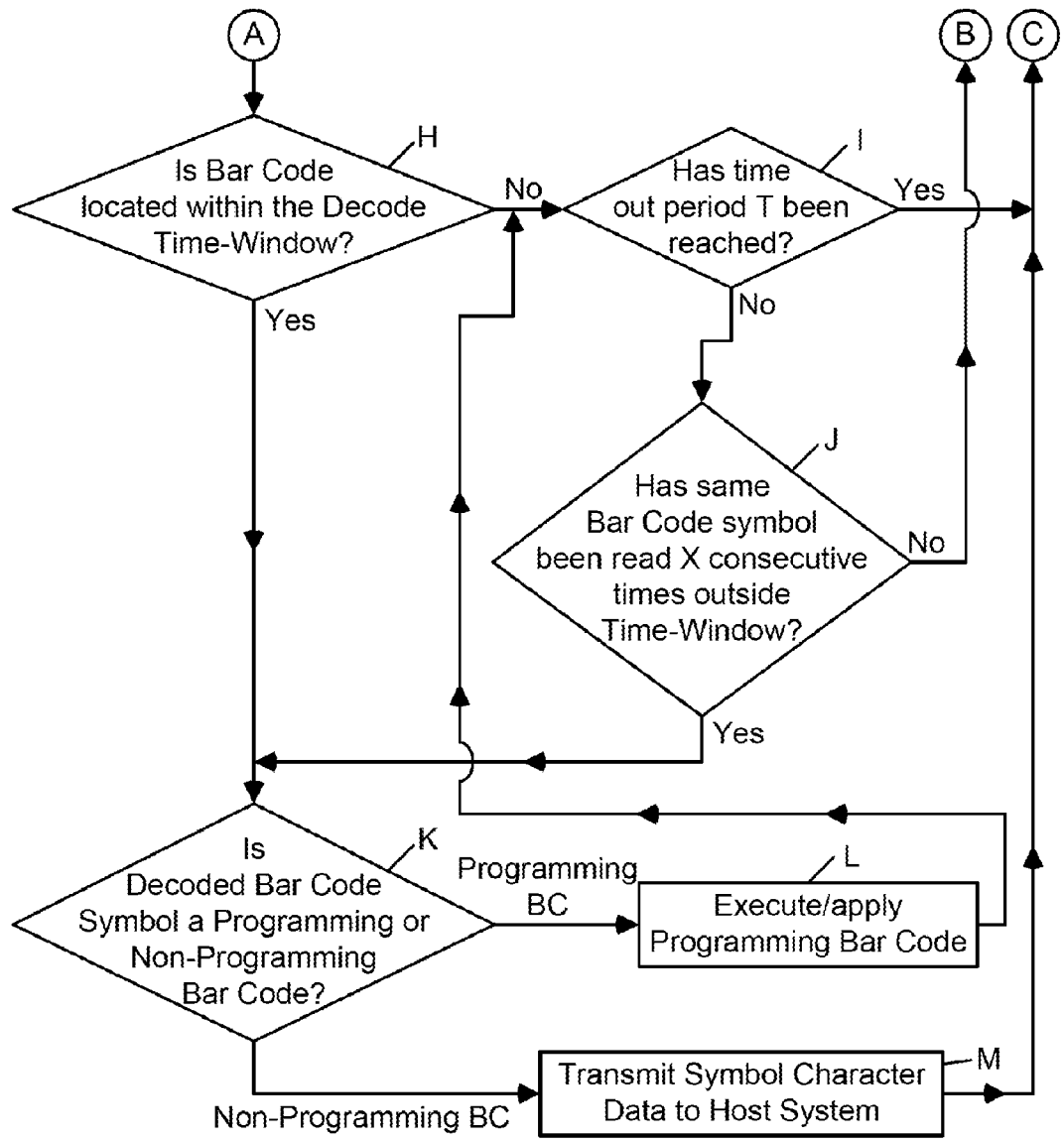

Referring to FIGS. 12A and 12B, the method of reading bar code symbols and controlling operations within the laser scanning bar code reader 600 will be described in greater detail.

As indicated in FIGS. 12A and 12B, the process orchestrated by system controller 150 begins at the START Block, where all system components are activated except for the laser and scanning motor (i.e. electromagnetic coil). Then at Block B in FIGS. 12A and 12B, the system controller determines if a trigger or activation event has occurred (i.e. trigger switch 104 has been manually depressed by the operator).

In the event that a trigger event has been detected at Block B, then the system controller proceeds to Block C1, and (i) activates the laser diode and scanner drive circuit 111 with a sufficient current to generate a full default scan sweep angle $\alpha_o(t)$ and (ii) then starts timeout period timer T1.

At Block C2, the analog scan data signal processor/digitizer ASIC 107 processes the return analog and/or digital scan data signals, and automatically (i) measures (e.g. estimates) the range or distance between the scanned object and the scanner, (ii) determines the time duration for the decode time-window filter as a function of determined object range/distance, and (iii) programs the time duration for the decode time-window filter, for the given moment of time during the control process.

As indicated at Block D, the system controller commands the buffering, in a scan data buffer 160, of a complete line of scan data collected for scanning directions, over a full scan sweep angle set during the current scanning cycle. Scan data from each scan direction is buffered in a different scan line data buffer.

At Block E, the system controller determines whether the decode processor 108 has decoded a bar code symbol based on the line of scan collected and buffered in the scan data buffer 160.

If, at Block E, a bar code symbol has not been decoded (i.e. read) within the buffered line of scan data, then the system controller proceeds to Block F and determines whether or not the time out period T1 has been reached. If the time out period has not been reached, then the system controller returns to Block C2, processes the scan data signals, determines the object range and updates the time duration of the decode time-window filter. Thereafter, the system controller proceeds to Block D and attempts to collect and decode scan data within time period T1 remaining. If the time out period has been reached, then the system controller proceeds to Block G, de-activates the laser source and scan motor, and then returns to Block B, as shown.

If at Block E, the system controller determines that a full bar code has been decoded, then at Block H the system controller determines if a bar code symbol is detected within the decode time-window set at Block C2, that is, is represented by scan data collected within the decode time-window set at Block D. If at least a portion of a decoded bar code symbol is not detected within scan data collected within the set decode time-window $T_{dtw}$ set at Block C2, then at Block I the system controller determines whether or not the time out period has lapsed. If the time out period has lapsed, then the system controller returns to Block B. If the time out period has not lapsed, then the system controller proceeds to Block J and determines whether or not the same bar code symbol has been decoded (i.e. read) a predetermined (e.g. X=3) number of consecutive times, while located completely (or substantially completely) outside the decode time-window $T_{dtw}$, by analyzing the scan data associated with each decoded code symbol. If the same bar code symbol has been decoded the predetermined number of times while being completely outside of the outside the decode time-window $T_{dtw}$, then the system controller proceeds to Block D and collects additional scan data and processes the same as indicated above. However, if the same bar code symbol has not been decoded the predetermined number of times while being completely outside of the outside the decode time-window $T_{dtw}$, then the system controller proceeds to Block K, as indicated in FIGS. 12A and 12B. Block J can be easily disabled from operation by setting parameter X as a relatively large number (e.g. 500).

If at Block H the system controller determines that a bar code is detected within the scan data collected within the decode time-window set at Block C2, then the system controller proceeds to Block J and decodes the bar code symbol based on the scan data within the decode time-window, and then proceeds to Block K to determine if the decoded bar code symbol is (i) a programming-type bar code symbol (including menu-reading bar code symbol), or (ii) a non-programming bar code symbol. If the decoded bar code symbol is a programming-type bar code symbol, then at Block L, the programming-type bar code symbol is programmed within the system, and then returns to Block B, as shown; and if the decoded bar code symbol is a non-programming-type bar code symbol, then at Block M, the bar code symbol character data is transmitted to the host system and then returns to Block B, as shown.

By virtue of the novel control process described in FIGS. 12A and 12B, the bar code symbol reader has the capacity to intelligently filter out bar code symbols that are scanned outside the dynamically-programmed decode time-windows (for different ranges/distance along the scan field), unless the option to transmit a consecutively decoded code symbol outside the time-window has been enabled. With this option enabled, an enhanced level of flexibility can be provided in particular scanning applications.

Some Modifications which Readily Come to Mind

While the illustrative embodiments disclosed the use of a 1D laser scanning module to detect visible and/or invisible bar code symbols on objects, it is understood that a 2D or raster-type laser scanning module can be used as well, to scan 1D bar code symbols, 2D stacked linear bar code symbols, and 2D matrix code symbols, and generate scan data for decoding processing.

While the time duration of the dynamically-programmed decode time-window filtering functions disclosed herein have been set as a % of the total scan line time length, of each line of scan data stored in the scan line data buffers of the system, it is understood that other techniques and criteria can be used to specify the time-window filter duration, either statically or dynamically, as the case may be.

Also, it is understood that a long/short range laser scanning can be provided with programmable decode time-window filtering capabilities, as described in detail above, but triggered using manually triggered switch as provided in the first illustrative embodiment, and a long/short range measurement subsystem to automatically determine where in the scan field the target object resides so that the optimized decode time-window filtering function is employed during bar code symbol decode processing operations.

While hand-supportable laser scanning systems have been illustrated, it is understood that these laser scanning systems can be packaged in a portable or mobile data terminal (PDT) where the laser scanning engine begins to scan in response to receiving a request to scan from the host computer 154 within the PDT. Also, the laser scanning system can be integrated into modular compact housings and mounted in fixed application environments, such as on counter-top surfaces, on wall surfaces, and on transportable machines such as forklifts, where there is a need to scan code symbols on objects (e.g. boxes) that might be located anywhere within a large scanning range (e.g. up to 20+ feet away from the scanning system). In such fixed mounted applications, the trigger signal can be generated by manual switches located a remote locations (e.g. within the forklift cab near the driver) or anywhere not located on the housing of the system.

During fix-mount applications, the left side, the right side or the center portion of the laser scan line can be defined as the center of the decode time-window filter function employed in the decode processor of the system. Also, the decode time-window filter will be triggered to transmit decode symbol character data to its destination, and intended use, only when at least a portion of the scan data string (in the scan line data buffer), associated with the decoded code symbol, falls within the decode time-window duration actively set within the system at any given moment of time.

Also, the illustrative embodiment have been described in connection with various types of code symbol reading applications involving 1-D and 2-D bar code structures (e.g. 1D bar code symbols, 2D stacked linear bar code symbols, and 2D matrix code symbols), it is understood that the present invention can be used to read (i.e. recognize) any machine-readable indicia, dataform, or graphically-encoded form of intelligence, including, but not limited to bar code symbol structures, alphanumeric character recognition strings, handwriting, and diverse dataforms currently known in the art or to be developed in the future. Hereinafter, the term "code symbol" shall be deemed to include all such information carrying structures and other forms of graphically-encoded intelligence.

It is understood that the digital-imaging based bar code symbol reading system of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope of the Claims appended hereto.

The invention claimed is:

1. A system for reading code symbols in a scanning field, comprising:

a source for generating a light beam;

a scanning mechanism for scanning the light beam across the scanning field;

a photo-detector for detecting the intensity of light reflected from the scanning field and generating a signal corresponding to the detected light intensity; and a processor for processing the signal to:
determine if a portion of a signal corresponding to a code symbol is within a decode time window; and
only decode the code symbol if a portion of the signal corresponding to the code symbol is within the decode time window;
wherein the decode time window corresponds to a percentage of a time duration of a single scan line defined about the center of the scan line, the left end of the scan line, or the right end of the scan line.

2. The system of claim 1, wherein the processor is configured for:
determining if the decoded code symbol is a programming-type code symbol; and
if the decoded code symbol is a programming-type code symbol, executing a function associated with the programming-type code symbol.

3. The system of claim 1, wherein the processor is configured for:
determining if the decoded code symbol is a programming-type code symbol; and
if the decoded code symbol is not a programming-type code symbol, generating and transmitting data representative of the decoded code symbol.

4. The system of claim 1, comprising memory, wherein the processor is configured for:
determining if the decoded code symbol is a programming-type code symbol; and
if the decoded code symbol is not a programming-type code symbol, generating and storing data representative of the decoded code symbol on the memory.

5. The system of claim 1, wherein the processor is configured for:
determining if the decoded code symbol is a decode time window programming-type code symbol; and
if the decoded code symbol is a decode time window programming-type code symbol, changing the percentage of the time duration of the single scan line to which the decode time window corresponds.

6. The system of claim 1, wherein the processor is configured for:
determining a distance between the system and a code symbol in the scanning field based on the signal; and
changing the percentage of the time duration of the single scan line to which the decode time window corresponds based on the determined distance.

7. The system of claim 1, wherein the processor is configured for:
if the signal corresponding to a code symbol is not within the decode time window, determining whether the code symbol has been in the scanning field for a predetermined number of scanning cycles; and
if the code symbol has been in the scanning field for a predetermined number of scanning cycles, decoding the code symbol, generating data representative of the decoded code symbol, and transmitting the data.

8. The system of claim 1, wherein the processor is configured for:
if the signal corresponding to a code symbol is not within the decode time window, determining whether the code symbol has been in the scanning field for a predetermined number of scanning cycles; and
if the code symbol has been in the scanning field for a predetermined number of scanning cycles, determining if the decoded code symbol is a programming-type code symbol;
if the decoded code symbol is a programming-type code symbol, decoding the code symbol and executing a function associated with the programming-type code symbol; and
if the decoded code symbol is not a programming-type code symbol, decoding the code symbol, generating data representative of the decoded code symbol, and transmitting the data.

9. A system for reading code symbols in a scanning field, comprising:
a hand-held housing;
a source for generating a light beam;
a scanning mechanism for scanning the light beam across the scanning field;
a photo-detector for detecting the intensity of light reflected from the scanning field and generating a signal corresponding to the detected light intensity; and
a processor for processing the signal to:
determine if a portion of a signal corresponding to a code symbol is within a decode time window; and
only decode the code symbol if a portion of the signal corresponding to the code symbol is within the decode time window;
wherein the decode time window corresponds to a percentage of a time duration of a single scan line defined about the center of the scan line.

10. The system of claim 9, wherein the processor is configured for:
determining if the decoded code symbol is a programming-type code symbol; and
if the decoded code symbol is a programming-type code symbol, executing a function associated with the programming-type code symbol.

11. The system of claim 9, wherein the processor is configured for:
determining if the decoded code symbol is a programming-type code symbol; and
if the decoded code symbol is not a programming-type code symbol, generating and transmitting data representative of the decoded code symbol.

12. The system of claim 9, comprising memory, wherein the processor is configured for:
determining if the decoded code symbol is a programming-type code symbol; and
if the decoded code symbol is not a programming-type code symbol, generating and storing data representative of the decoded code symbol on the memory.

13. The system of claim 9, wherein the processor is configured for:
determining if the decoded code symbol is a decode time window programming-type code symbol; and
if the decoded code symbol is a decode time window programming-type code symbol, changing the percentage of the time duration of the single scan line to which the decode time window corresponds.

14. The system of claim 9, comprising a range detection subsystem for determining a distance between the system and a code symbol in the scanning field;
wherein the processor is configured for changing the percentage of the time duration of the single scan line to which the decode time window corresponds based on the distance determined by the range detection subsystem.

15. The system of claim 9, wherein the processor is configured for:
- if the signal corresponding to a code symbol is not within the decode time window, determining whether the code symbol has been in the scanning field for a predetermined number of scanning cycles; and
- if the code symbol has been in the scanning field for a predetermined number of scanning cycles, decoding the code symbol, generating data representative of the decoded code symbol, and transmitting the data.

16. The system of claim 9, wherein the processor is configured for:
- if the signal corresponding to a code symbol is not within the decode time window, determining whether the code symbol has been in the scanning field for a predetermined number of scanning cycles; and
- if the code symbol has been in the scanning field for a predetermined number of scanning cycles, determining if the decoded code symbol is a programming-type code symbol;
- if the decoded code symbol is a programming-type code symbol, decoding the code symbol and executing a function associated with the programming-type code symbol; and
- if the decoded code symbol is not a programming-type code symbol, decoding the code symbol, generating data representative of the decoded code symbol, and transmitting the data.

17. A method for determining a portion of a scan line to which a decoding time window corresponds for a system for reading code symbols in a scanning field, the method comprising:
- determining a distance between the system and a code symbol in the scanning field; and
- changing the portion of the scan line to which the decode time window corresponds based on the determined distance.

18. The method of claim 17, wherein:
- the system comprises a photo-detector for detecting the intensity of light reflected from the scanning field and generating a signal corresponding to the detected light intensity; and
- the step of determining the distance comprises determining the distance between the system and the code symbol in the scanning field based on the signal generated by the photo-detector.

19. The method of claim 17, wherein:
- the system comprises a range detection subsystem for determining the distance between the system and the code symbol in the scanning field; and
- the step of determining the distance comprises determining the distance between the system and the code symbol in the scanning field based on the output of the range detection subsystem.

20. The method of claim 17, comprising:
- decoding a code symbol in the scanning field using the system;
- determining if the decoded code symbol is a decode time window programming-type code symbol; and
- if the decoded code symbol is a decode time window programming-type code symbol, changing a portion of a scan line to which the decode time window corresponds.

* * * * *